United States Patent

Uchida et al.

[11] Patent Number: 6,127,947
[45] Date of Patent: Oct. 3, 2000

[54] VEHICLE INFORMATION COMMUNICATION DEVICE AND VEHICLE INFORMATION COMMUNICATION SYSTEM

[75] Inventors: Toshihiro Uchida; Hiroshi Honda; Akihiro Tanaka; Kazunori Sakai; Norimasa Hiramatsu, all of Aichi-ken, Japan

[73] Assignee: Toyota Jidosha Kabushiki Kaisa, Toyota, Japan

[21] Appl. No.: 09/297,963

[22] PCT Filed: Nov. 13, 1997

[86] PCT No.: PCT/JP97/04147

§ 371 Date: Jul. 12, 1999

§ 102(e) Date: Jul. 12, 1999

[87] PCT Pub. No.: WO98/21077

PCT Pub. Date: May 22, 1998

[30] Foreign Application Priority Data

Nov. 13, 1996 [JP] Japan .................................. 8-302164
Nov. 25, 1996 [JP] Japan .................................. 8-313908

[51] Int. Cl.[7] .................................................. B60Q 1/00
[52] U.S. Cl. .......................... 340/999; 340/439; 340/539; 701/24; 455/420
[58] Field of Search ...................... 340/639, 539, 340/531, 999; 73/116; 701/24; 770/338; 455/420; 702/122

[56] References Cited

U.S. PATENT DOCUMENTS

| | | | |
|---|---|---|---|
| 4,853,850 | 8/1989 | Krass, Jr. et al. | 701/35 |
| 5,278,759 | 1/1994 | Berra et al. | 701/1 |
| 5,442,553 | 8/1995 | Parrillo | 455/420 |
| 5,499,181 | 3/1996 | Smith | 455/456 |
| 5,513,107 | 4/1996 | Gormley | 701/48 |
| 5,815,071 | 9/1998 | Doyle | 340/439 |
| 5,844,473 | 12/1998 | Kaman | 340/439 |
| 5,848,064 | 12/1998 | Cowan | 370/338 |
| 5,867,089 | 2/1999 | Zyburt et al. | 340/323 R |
| 5,908,454 | 6/1999 | Zyburt et al. | 701/24 |
| 6,029,508 | 2/2000 | Schoenbeck et al. | 73/116 |

FOREIGN PATENT DOCUMENTS

| | | |
|---|---|---|
| 0 383 593 | 8/1990 | European Pat. Off. . |
| 2-99439 | 4/1990 | Japan . |
| 5-195859 | 8/1993 | Japan . |
| 6-219187 | 8/1994 | Japan . |
| 6-229767 | 8/1994 | Japan . |
| 6-266997 | 9/1994 | Japan . |
| 6-297983 | 10/1994 | Japan . |
| 7-223516 | 8/1995 | Japan . |
| 3-203770 | 9/1995 | Japan . |
| 8-95488 | 4/1996 | Japan . |

*Primary Examiner*—Benjamin C. Lee
*Attorney, Agent, or Firm*—Burns, Doane, Swecker & Mathis, LLP

[57] ABSTRACT

A vehicle onboard device having characteristics capable of being changed communicates with a vehicle to set a characteristic value to an optimum value. Parameters for setting conditions of an electronic device are called out of an $E^2PROM$ $14_i$ of the vehicle $10_i$ and are transmitted to a technology center 40 via a dealer $20_1$, and an information center $30_1$. Each dealer $20_1$, the information center $30_1$, and the technology center 40 accumulate the parameters. The technology center 40 can collect the parameters of numerous vehicles and characteristic values for electronic control of each of the vehicles and can calculate newest and optimum parameters. The technology center 40 transmits this newest and optimum vehicle information to the vehicle $10_i$, and each vehicle updates the parameters thereof to these newest and optimum parameters. Accordingly, the parameters of the vehicle are set as the newest parameters.

13 Claims, 15 Drawing Sheets

F I G. 1
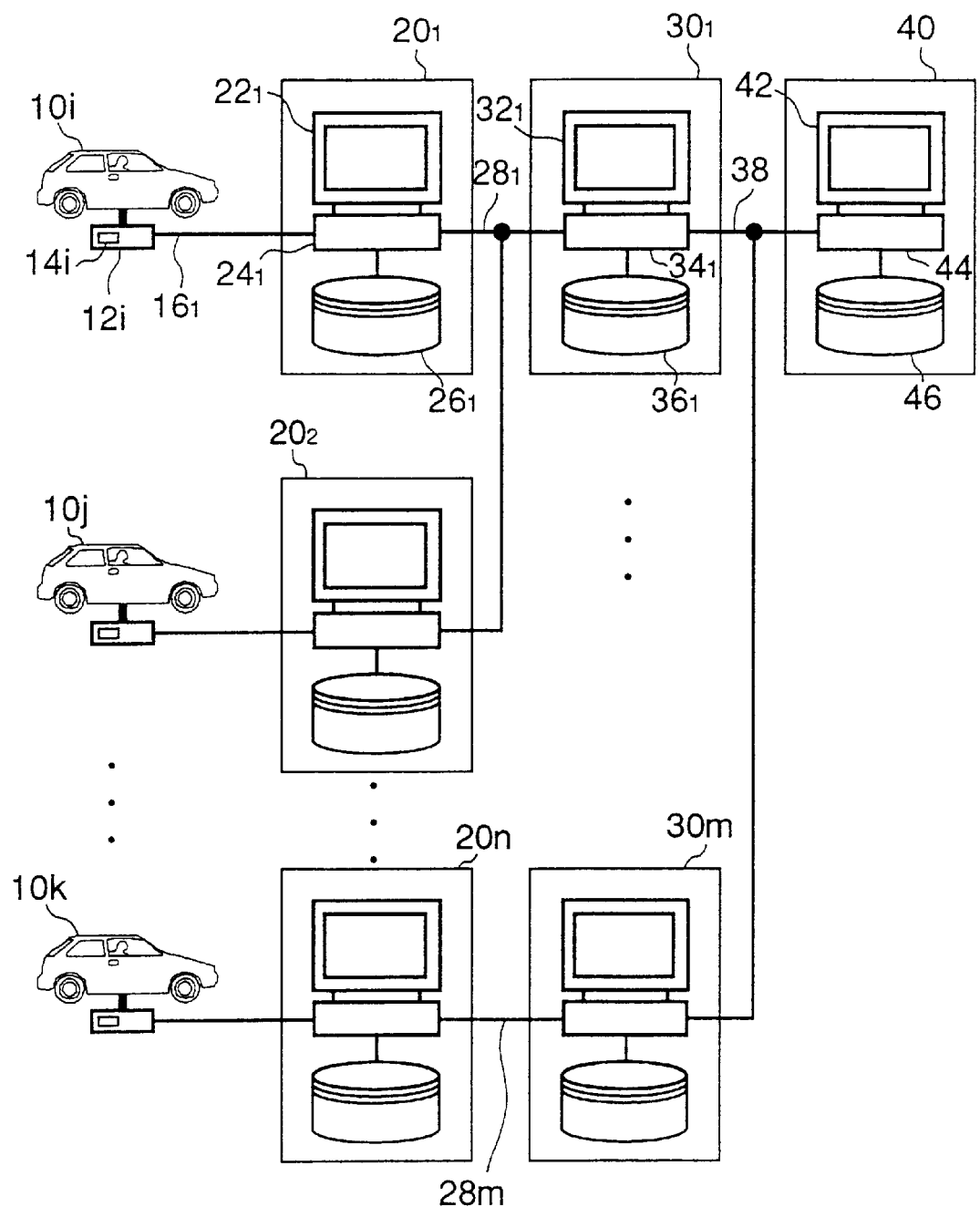

VEHICLE INFORMATION COMMUNICATION DEVICE AND VEHICLE INFORMATION COMMUNICATION SYSTEM

TECHNICAL FIELD

The present invention relates to a vehicle information communication device and a vehicle information communication system, and particularly relates to a vehicle information communication device and a vehicle information communication system communicating information with a vehicle when characteristics of a vehicle onboard device which characteristics are capable of being changed are changed intentionally by a user, or by geographical factors, etc.

BACKGROUND ART

In recent years, a plurality of electronic control units (hereinafter, called ECUs) have been mounted in a vehicle. This plurality of ECUs are connected to each other by a bus so that a local area network (hereinafter, called a LAN) is constructed. Data can be communicated between these ECUs.

Each of the plurality of ECUs controls the characteristics of a vehicle onboard device. Characteristic values for determining the characteristics of the vehicle onboard devices governed by of each ECU is stored in that ECUs. For example, when the vehicle onboard device is a headlamp, there is an ECU for controlling a turning-on operation in which the headlamp is automatically turned on when the vehicle enters a tunnel and is also automatically turned on in the evening, etc. In this case, the headlamp is turned on when illuminance from an illuminance sensor is less than a predetermined value. This automatic turning-on time, i.e., the predetermined illuminance value can be set as a different value in depending on the user and the local area. Accordingly, there are cases in which a change in the predetermined illuminance value is required.

A general control system for an automobile is proposed as a system capable of changing the control parameter program of each of the ECUs mounted in such a vehicle in accordance with a user's taste (see Japanese Patent Application Laid-Open (JP-A) No. 6-219187). In this technique, a characteristic value for electronic control of the vehicle is obtained by a controller and is sent to a service center and the analyzed results of the characteristic value can be shown to a driver. Further, it is possible to maintain and check the characteristic value as to whether or not there is a problem with the characteristic value proper to the vehicle.

However, in the conventional system, the characteristic values of the individual vehicle can be maintained and checked, but characteristics arising from the intentions of the user of from the local geography can be automatically reflected. Further, the characteristic values of the individual vehicle can be maintained and checked, but characteristics arising from the intentions of the user or from the local geography cannot be reflected. Furthermore, the characteristic values must be finely adjusted for each individual vehicle. For example, changes in the characteristics arising from the tastes of many users and the characteristic values of a particular vehicle are continually changing. Accordingly, the user's intentions, etc. cannot be reflected by only simply maintaining and checking the characteristic values.

Further, there is a case in which the vehicle onboard device is replaced with a new device or other parts due to the passage of time, device replacement, etc. In this case, the characteristic values of the ECU governing the new vehicle onboard device are different or are unrecorded. Accordingly, it is necessary to set at least the pertinent characteristic values every time the vehicle onboard device is replaced with a new device or other parts.

However, in the conventional system, the characteristic values for electronic control of the vehicle are obtained and are maintained and checked in accordance with the suggestion of the analyzed results of the service center. Accordingly, it is necessary to perform a complicated operation in which the characteristics of all vehicle onboard devices are obtained and the pertinent characteristic values in the maintenance and checking are set to suitable values every time a vehicle onboard device is replaced with a new device or with another part.

Further, there are now vehicles capable of being equipped with controllers such as a telephone system, a navigation system, a TV system, etc., and information according to the tastes of the main user, e.g. the driver, may be recorded to each of these controllers. This information may consist of personal information such as a rest of telephone numbers, address data, a list of recorded locations relating to destinations of the navigation system, etc. set by an individual. This personal information is not as widely used as the control information, but there is a desire for temporarily and reliably holding this personal information.

However, in the conventional system, the characteristic value of the individual vehicle can be maintained and checked, but no non-general use information such as personal information can be held.

In consideration of the above facts, an object of the present invention is to provide a vehicle information communication device and a vehicle information communication system capable of communicating with a vehicle to set a characteristic value of a vehicle onboard device capable of changing the characteristics to their optimum values.

Further, in addition to the above object, another object of the present invention is to provide a vehicle information communication device and a vehicle information communication system capable of simply setting the characteristics of the vehicle onboard device capable of changing the characteristics.

DISCLOSURE OF INVENTION

To achieve the above objects, a vehicle information communication device in the invention described in claim 1 comprises control means for a vehicle which is mounted in the vehicle and is connected to a vehicle onboard device having characteristics capable of being changed, and which stores characteristic values for determining the characteristics of the vehicle onboard device and controls the characteristics of the vehicle onboard device using these characteristic values; and communication control means which can be connected to said control means for a vehicle, and which stores characteristic values for determining characteristics of said vehicle onboard device, including previously predetermined characteristic values of said control means for a vehicle, and also reads characteristic values stored in said control means for a vehicle and obtains stored characteristic values corresponding to the read characteristic values, and updates characteristic values stored in said control means for a vehicle to said obtained characteristic values.

In the vehicle information communication device described in claim 1, the invention described in claim 2 is characterized in that said communication control means accumulates, as said stored characteristic values, vehicle information including previously determined characteristic values of said control means for a vehicle and reads characteristic values stored in said control means for a vehicle as vehicle information and obtains accumulated vehicle information corresponding to read vehicle information, and updates characteristic values stored in said control means for a vehicle with characteristic values included in the obtained vehicle information.

In the vehicle information communication device described in claim 2, the invention described in claim 3 is characterized in that said communication control means comprises accumulating means for accumulating the vehicle information including previously determined characteristic values of said control means for a vehicle; and communication control means which is connected to said control means for a vehicle and said accumulating means and reads the characteristic values stored in said control means for a vehicle as vehicle information and obtains the vehicle information accumulated in said accumulating means and which corresponds to read vehicle information, and updates characteristic values stored in said control means for a vehicle to characteristic values included in the obtained vehicle information.

In the vehicle information communication device described in claim 2 or 3, the invention described in claim 4 is characterized in that said control means for a vehicle is connected via a local area network for a vehicle to a plurality of vehicle onboard devices each of whose characteristics are capable of being altered, and stores each characteristic value for determining each of the characteristics of said plurality of vehicle onboard devices, and controls the characteristics of each of said plurality of vehicle onboard devices by each characteristic value.

In the vehicle information communication device described in any one of claims 2 to 4, the invention described in claim 5 is characterized in that said accumulating means accumulates vehicle information calculated on the basis of information of a plurality of vehicles read by said communication control means.

In the vehicle information communication device described in claim 1, the invention described in claim 6 is characterized in that said communication control means is provided externally of said vehicle and can be connected to said control means for a vehicle by wireless communication and comprises receiving means for receiving said information by said communication control means from said control means for a vehicle, and transmitting means for transmitting said information to said control means for a vehicle; and, when information including characteristic values is transmitted and received between said control means for a vehicle and said communication control means, said receiving means and said transmitting means simultaneously perform at least one portion of the reception of said information in said receiving means and the transmission of said information in said transmitting means.

In the vehicle information communication device described in claim 6, the invention described in claim 7 is characterized in that said communication control means receives request information requested from a vehicle from said control means for a vehicle, and transmits response information expressing a response to said request information from said communication control means to said control means for a vehicle.

In the vehicle information communication device described in claim 6 or 7, the invention described in claim 8 is characterized in that said communication control means is connected to said control means for a vehicle by wireless communication using a mobile wireless telephone circuit.

In the vehicle information communication device described in claim 1, the invention described in claim 9 is characterized in that said control means for a vehicle comprises a plurality of device control means each controlling characteristics for determining characteristics of each vehicle onboard device governed by each device control means, and each device control means stores characteristic values for determining characteristics of said vehicle onboard devices as main characteristic values in memory means, and the memory means is capable of storing characteristic values for determining characteristics of another vehicle onboard device as subcharacteristic values, and controls characteristics of a governed vehicle onboard device on the basis of the main characteristic value stored in the memory means; and said communication control means comprises register means for storing characteristic values of the governed vehicle onboard devices in each of the memory means of said device control means as the main characteristic values and storing main characteristic values other than the main characteristic values to be stored in at least one of said memory means in this memory means as subcharacteristic values; and update means which obtains the main characteristic values and the subcharacteristic values stored in each of the memory means of said device control means, and calculates the main characteristic values of the device control means relative to the obtained subcharacteristic values on the basis of the obtained subcharacteristic values and the main characteristic values stored in the memory means of the device control means relative to these subcharacteristic values, and updates the main characteristic values of the memory means of said device control means to the calculated main characteristic values.

In the vehicle information communication device described in claim 9, the invention described in claim 10 is characterized in that the vehicle information communication device further comprises changing means for changing main characteristic values stored in said memory means wherein, when the main characteristic values are changed by said changing means, said register means stores in main characteristic values in the memory means apart from the memory means having the changed main characteristic values as the subcharacteristic values.

In the vehicle information communication device described in claim 9 or 10, the invention described in claim 11 is characterized in that the plurality of device control means of said control means for a vehicle are connected to each other by a local area network for a vehicle.

The invention described in claim 12 resides in a vehicle information communication system characterized in that information is communicated between control means for a vehicle for controlling characteristics of a vehicle onboard device mounted in the vehicle using of characteristic values for determining the characteristics of the vehicle onboard device and characteristic value memory means provided externally of said vehicle and storing said characteristic values, wherein: characteristic values for determining the characteristics of said vehicle onboard device, including previously determined characteristic values of said control means for a vehicle are stored in said characteristic value memory means; the characteristic values stored in said control means for a vehicle are read; the characteristic values corresponding to the read characteristic values and stored in said characteristic values memory means are obtained; and the characteristic values stored in said control means for a vehicle are updated to said obtained characteristic values.

The invention described in claim 13 resides in a vehicle information communication system characterized in that information is communicated between control means for a vehicle for controlling characteristics of a vehicle onboard device mounted in the vehicle using characteristic values for determining the characteristics of the vehicle onboard device and characteristic value memory means provided externally of said vehicle and storing said characteristic values, wherein the vehicle information communication system simultaneously performs at least one portion of each of processing for receiving information including said characteristic values from said control means for a vehicle connected by wireless communication, and processing for transmitting information including said characteristic values to said control means for a vehicle connected by wireless communication.

The invention described in claim 14 resides in a vehicle information communication system characterized in that information is communicated between control means for a vehicle for controlling characteristics of a vehicle onboard device mounted in the vehicle using characteristic values for determining the characteristics of the vehicle onboard device and characteristic value memory means provided externally of said vehicle and storing said characteristic values, wherein: said control means for a vehicle comprises a plurality of device control means each controlling characteristics for determining the characteristics of each vehicle onboard device governed by the device control means and each device control means stores characteristic values for determining the characteristics of said vehicle onboard device as main characteristic values, and has memory means capable of storing characteristic values for determining characteristics of another vehicle onboard device as subcharacteristic values, and controls the characteristics of the governed vehicle onboard device on the basis of the main characteristic values stored in the memory means; said control means for a vehicle stores the characteristic values of the governed vehicle onboard device in each of the memory means of said device control means as main characteristic values, and stores main characteristic values other than the main characteristic values to be stored in at least one of said memory means in this memory means as subcharacteristic values; and said control means for a vehicle obtains the main characteristic values and the subcharacteristic values stored in each of the memory means of said device control means, and calculates the main characteristic values of the device control means relative to the obtained subcharacteristic values on the basis of the obtained subcharacteristic values and the main characteristic values stored in the memory means of the device control means relative to these subcharacteristic values, and updates the calculated main characteristic value to the main characteristic values of the memory means of said device control means.

In the invention of claim 1, the control means for the vehicle controls the characteristics of a vehicle onboard device mounted in the vehicle by the stored characteristic values. Vehicle onboard devices include interior electric mounted devices such as a headlamp device, etc., chassis devices such as a suspension device, etc. Guiding devices such as a communication device, a navigation system, etc. capable of changing characteristic values of a telephone and the like provided within the vehicle can be adopted as a vehicle onboard device. The characteristic values of these communication devices may consist of a telephone directory for storing dial numbers determined in advance and registered by a user, sound volumes at the time of communicating, and the like. The characteristic values of the guiding device may consist of display ranges of destinations and map information, etc. This control means for the vehicle can be connected to the communication control means. This communication control means stores the characteristic values for determining the characteristics of the vehicle onboard device including the previously determined characteristic values of the control means for the vehicle. The communication control means reads the characteristic values stored in the control means for the vehicle and obtains the stored characteristic values corresponding to the read characteristic values. The communication control means also updates the characteristic values stored in the control means for the vehicle to the obtained characteristic values. Thus, the characteristic values stored in the control means for the vehicle are read and the corresponding characteristic values are obtained and updated so that the characteristic values stored in the control means for the vehicle can be updated to optimum characteristic values and the characteristic values of the control means for the vehicle can be adjusted to the best state.

In the invention of claim 2, as mentioned above, the control means for the vehicle controls the characteristics of the vehicle onboard device such as a interior electric mounted device such as a headlamp device, etc. mounted in the vehicle, a chassis device, etc. such as a suspension device, etc. by the stored characteristic values. There is an ECU for performing control governing each of these vehicle onboard devices in this control means for the vehicle. This control means for a vehicle is connected to the communication control means. This communication control means can be connected to accumulating means for accumulating vehicle information including the previously determined characteristic values of the control means for a vehicle. The accumulating means consists of a technology center and a central processing center for collecting various kinds of technical information, etc. In the vehicle information, the type of vehicle having the characteristic values can be set as attribute information with respect to the characteristic values.

It is possible to treat the characteristic values in accordance with the type of car by adding the type of car to the vehicle information even when the characteristic values are different for each type of car. The communication control means reads the characteristic values stored in the control means for the vehicle as vehicle information and obtains the vehicle information accumulated in the accumulating means and corresponding to the read vehicle information. The vehicle information can be read when the characteristics of the vehicle onboard device are adjusted by a dealer, etc.

The communication control means also updates the characteristic values stored in the control means for the vehicle to characteristic values included in the obtained vehicle information. The communication control means consists of a controller of a dealer, an automobile inspection place, etc. able to be connected to the vehicle and able to be also connected to the technology center, etc. by a telephone circuit etc. Thus, the characteristic values stored in the control means for the vehicle are read and the corresponding vehicle information is obtained and the characteristic values are updated so that the characteristic values stored in the control means for the vehicle can be updated to optimum characteristic values and the characteristic values of the control means for a vehicle can be adjusted to the best state.

In the invention of claim 3, the communication control means is connected to the control means for the vehicle and the accumulating means. The communication control means reads the characteristic value stored to the control means for the vehicle as vehicle information and obtains the vehicle information accumulated in the accumulating means and corresponding to the read vehicle information. The communication control means then updates the characteristic value stored to the control means for the vehicle to a characteristic value included in the obtained vehicle information. Thus, the characteristic value stored to the control means for the vehicle is read and the corresponding vehicle information accumulated in the accumulating means is obtained and the characteristic value is updated. Accordingly, the characteristic value stored to the control means for the vehicle can be updated to an optimum characteristic value and the characteristic value of the control means for the vehicle can be adjusted to a best state.

There are a plurality of vehicle onboard devices connected to each other by a local area network for the vehicle within the vehicle and constructed such that operations of the respective vehicle onboard devices are generalized and managed within the vehicle. In this case, there is a case in which the characteristic value is stored together when characteristics of the individual vehicle onboard devices are changed. Therefore, as described in claim 4, if said control means for the vehicle is connected to the plurality of vehicle onboard devices capable of respectively changing characteristics by the local area network for the vehicle and each characteristic value for determining the characteristics of each of said plurality of vehicle onboard devices is stored and the characteristics of each of said plurality of vehicle onboard devices are controlled by this each characteristic value, the characteristic value corresponding to each of the plurality of vehicle onboard devices can be requested and managed together.

In a vehicle dealer for treating many vehicles, it is possible to collect many characteristic values for electronic control of electronic devices mounted to each vehicle. These many characteristic values include many characteristic values changed so far by a user's intention and area characteristics. Accordingly, as described in claim 5, if said accumulating means accumulates vehicle information calculated on the basis of information of a plurality of vehicles read by said communication control means, the vehicle information including the characteristic values can be set to be newest and easily accumulated. Further, a tendency to the characteristic values at a collecting time point can be also calculated on the basis of the collected characteristic values. An optimum characteristic value, e.g., a characteristic value intended by a user in the future can be predicted from this tendency so that the characteristic value of the vehicle onboard device can be set to a newest characteristic value.

Here, when information is transmitted and received between the vehicle and its exterior, this information is generally transmitted and received in a communication condition along a predetermined protocol. In the case of communication for transmitting and receiving information, the reception and the transmission are normally exclusive and one of the reception and the transmission is performed by using a line. Therefore, in the case of the information transmission and reception, a receiving side requests a receipt and then waits for this receipt. Further, when a transmitting side transmits requested information, no transmitting side can receive the next request so that a communication load is increased.

Therefore, in the invention of claim 6, information can be simultaneously transmitted and received bidirectionally. Namely, the communication control means arranged outside said vehicle can be connected to the control means for the vehicle by wireless communication, and is constructed by receiving means for receiving information from the control means for the vehicle by the communication control means, and transmitting means for transmitting said information to said control means for the vehicle. When this communication control means transmits and receives information including the characteristic value between the control means for the vehicle and the communication control means, the receiving means and the transmitting means simultaneously perform at least one portion of the reception of the information in the receiving means and the transmission of the information in the transmitting means. Thus, the communication control means can simultaneously transmit and receive the information bidirectionally so that the communication load is reduced.

When the above information is transmitted and received, it is necessary to confirm the requested information on both sides so as to reliably transmit and receive the requested information. Therefore, as described in claim 7, said communication control means receives the request information requested from a vehicle side from the control means for the vehicle, and transmits reply information showing a reply to the request information from the communication control means to the control means for the vehicle. Thus, the reply to the request can be reliably obtained.

As described in claim 8, said communication control means is connected to the control means for the vehicle by wireless communication using a moving wireless telephone line so that the wireless communication can be easily performed.

There is a case in which the number of vehicle onboard devices is increased and the vehicle onboard device is partially exchanged for a new kind of vehicle onboard device and is exchanged for the same kind of vehicle onboard device and a similar kind of vehicle onboard device to make a repair. In this case, the characteristic value must be again determined. Therefore, in claim 9, the characteristic value of the vehicle onboard device is stored to a device except for the device in charge of this characteristic value so that backup can be performed.

Namely, in the invention of claim 9, the control means for the vehicle mounted to the vehicle is constructed by a plurality of device control means. Each of the device control means has a memory means. The memory means can store a characteristic value for determining characteristics of the vehicle onboard device capable of changing the characteristics as a main characteristic value. The memory means can also store a characteristic value for determining characteristics of another vehicle onboard device as a subcharacteristic value. The device control means controls the characteristics of the vehicle onboard device in charge on the basis of the main characteristic value stored to the memory means. This main characteristic value and the subcharacteristic value are stored by a register means connected such that data can be communicated. Namely, the characteristic value of the vehicle onboard device in charge of each of the memory means of the device control means is stored as the main characteristic value, and at least one of the plurality of memory means stores a main characteristic value except for the main characteristic value of this memory means as the subcharacteristic value.

An update means obtains the main characteristic value and the subcharacteristic value stored to each of the memory means of the device control means. The update means also calculates the main characteristic value of the device control means relative to this subcharacteristic value on the basis of the obtained subcharacteristic value and the main characteristic value stored to the memory means of the device control means relative to this obtained subcharacteristic value. For example, the subcharacteristic value memorized in another device control means and stored to a specific device control means can be set to the main characteristic value.

When the main characteristic value memorized to the specific device control means is different from the main characteristic value memorized as the subcharacteristic value in another device control means and stored to the specific device control means from compared results, a newest main characteristic value can be set to the main characteristic value. Further, when the main characteristic value memorized to the specific device control means is different from the main characteristic value memorized as the subcharacteristic value in a plurality of other device control means and stored to the specific device control means from compared results, a newest main characteristic value and a main characteristic value having high probability in expectation can be set to the main characteristic value. The update means updates the calculated main characteristic value as a main characteristic value of the memory means of the device control means. Accordingly, the stored main characteristic value can be obtained from another device control means and can be set to be perfect even when the main characteristic value memorized in the memory means of the specific device control means is imperfect.

As described in claim 10, said vehicle information communication device can further have a changing means for changing the main characteristic value stored to the memory means. In this case, the register means stores the main characteristic value to a memory means except for the memory means changed at a changing time of the main characteristic value changed by the changing means as a subcharacteristic value. Accordingly, when the main characteristic value is changed, this main characteristic value is stored to the memory means except for the changed memory means as the subcharacteristic value. Therefore, the main characteristic value at the changing time point is stored.

When a device controller is exchanged, there is a case in which no main characteristic value is stored to the memory means. In this case, the subcharacteristic value memorized in another device control means and stored to a specific device control means is set to the main characteristic value. A newest subcharacteristic value and a subcharacteristic value having high probability in expectation from the subcharacteristic values stored to a plurality of other device control means are set to the main characteristic value, and this main characteristic value is updated by the update means as a main characteristic value of the memory means of the device control means.

When the device control means is newly connected, i.e., when a new device control means different from said plurality of device control means is mounted to the vehicle, said changing means specifies a device and determines a priority order of the device on the basis of the main characteristic value stored to the memory means of each of said plurality of device control means. Thus, the characteristic value of the vehicle onboard device in charge of the new device control means can be stored as the main characteristic value, and this main characteristic value can be also stored to the memory means of at least one of the other device control means as the subcharacteristic value.

There are a plurality of vehicle onboard devices connected to each other by a local area network for the vehicle within the vehicle such that each of the vehicle onboard devices is generalized and managed within the vehicle. No other new constructions are required if the characteristic value of each of these individual vehicle onboard devices is stored and transmitted and received between the plurality of vehicle onboard devices.

Therefore, as described in claim 11, if said plurality of device control means are connected to each other by the local area network for the vehicle, the characteristic value can be stored and transmitted and received between the device control means in charge of the respective a plurality of vehicle onboard devices.

The above characteristic value is effectively transmitted and received in a vehicle information communication system for communicating information between a device mounted to the vehicle and a device arranged outside the vehicle.

In a vehicle information communication system of claim 12, information is communicated between control means for a vehicle for controlling the characteristics of a vehicle onboard device mounted to the vehicle by a characteristic value for determining the characteristics of the vehicle onboard device and characteristic value memory means arranged outside the vehicle and storing the characteristic value.

In this vehicle information communication system, the characteristic value for determining the characteristics of the vehicle onboard device including a predetermined characteristic value of the control means for the vehicle is stored to said characteristic value memory means. Further, the characteristic value stored to the control means for the vehicle is read, and the characteristic value corresponding to the read characteristic value and stored to the characteristic value memory means is obtained. The characteristic value stored to the control means for the vehicle is updated to said obtained characteristic value.

Thus, the corresponding characteristic value is obtained and updated by reading the characteristic value stored to the control means for the vehicle. Accordingly, the characteristic value stored to the control means for the vehicle can be updated to an optimum characteristic value and the characteristic value of the control means for the vehicle can be adjusted to a best state.

A vehicle information communication system in the invention of claim 13 simultaneously performs at least one portion of each of processing for receiving information including the characteristic value from the control means for the vehicle connected by wireless communication, and processing for transmitting information including said characteristic value to said control means for the vehicle connected by the wireless communication. Thus, a communication load is reduced since the communication control means can simultaneously transmit and receive information bidirectionally.

In a vehicle information communication system of claim 14, the control means for the vehicle is constructed by a plurality of device control means each controlling characteristics for determining the characteristics of each vehicle onboard device in charge. Each device control means stores the characteristic value for determining the characteristics of the vehicle onboard device as a main characteristic value, and has memory means capable of storing a characteristic value for determining characteristics of another vehicle onboard device as a subcharacteristic value, and controls the characteristics of the vehicle onboard device in charge on the basis of the main characteristic value stored to the memory means.

The characteristic value of the vehicle onboard device in charge is stored to each of the memory means of these device control means as the main characteristic value, and a main characteristic value except for the main characteristic value to be stored to at least one of said memory means is stored to this memory means as a subcharacteristic value. The main characteristic value and the subcharacteristic value stored to each of the memory means of the device control means are obtained. The main characteristic value of the device control means relative to the obtained subcharacteristic value is calculated on the basis of the obtained subcharacteristic value and the main characteristic value stored to the memory means of the device control means relative to this subcharacteristic value. The calculated main characteristic value is updated as the main characteristic value of the memory means of the device control means.

Accordingly, the stored main characteristic value can be obtained from another device control means and can be set to be perfect even when the main characteristic value stored to the memory means of a specific device control means is imperfect.

As mentioned above, in accordance with the invention described in claim 1, the characteristic value stored to the control means for the vehicle is read and a corresponding characteristic value is obtained and updated so that the characteristic value stored to the control means for the vehicle can be updated to an optimum characteristic value.

In accordance with the invention described in claim 2, the characteristic value stored to the control means for the vehicle is read and corresponding vehicle information is obtained and the characteristic value is updated. Accordingly, the characteristic value stored to the control means for the vehicle can be updated to an optimum characteristic value and the characteristic value of the control means for the vehicle can be adjusted to a best state.

In accordance with the invention described in claim 3, the plurality of vehicle onboard devices are connected to each other by the local area network for the vehicle, and each of the characteristics of the plurality of vehicle onboard devices can be controlled by each characteristic value. Accordingly, the characteristic value corresponding to each of the plurality of vehicle onboard devices can be requested and managed together.

In accordance with the invention described in claim 4, the vehicle information calculated on the basis of information of a plurality of vehicles is accumulated to the accumulating means. Accordingly, the vehicle information including the characteristic value can be set to be newest and easily accumulated. Further, a tendency to the characteristic value at its collecting time is also calculated and the characteristic value of the vehicle onboard device can be set to an optimum characteristic value.

In accordance with the invention described in claim 5, the vehicle information calculated on the basis of read information of a plurality of vehicles is accumulated to the accumulating means so that the characteristic value, etc. can be set to be newest and easily accumulated. Accordingly, a tendency to the characteristic value at its collecting time point and a characteristic value intended by a user in the future, etc. can be predicted on the basis of the collected characteristic value.

In accordance with the invention described in claim 6, information can be simultaneously transmitted and received bidirectionally by the communication control means so that a communication load can be reduced.

In accordance with the invention described in claim 7, request information required from a vehicle side from the control means for the vehicle is received, and reply information showing a reply to the request information can be transmitted from the communication control means to the control means for the vehicle. Accordingly, the reply to the request can be reliably obtained.

In accordance with the invention described in claim 8, the communication control means is connected to the control means for the vehicle by wire communication using a moving wireless telephone line so that information can be easily wirelessly communicated.

In accordance with the invention described in claim 9, the subcharacteristic value stored to another device control means is read and the main characteristic value of the self device control means is updated. Accordingly, the main characteristic value to be stored to the device control means can be updated to an optimum characteristic value so that the characteristic value of the device control means can be adjusted to a best state.

In accordance with the invention described in claim 10, when the main characteristic value is changed by the changing means for changing the main characteristic value, the register means stores the main characteristic value to another memory means as a subcharacteristic value. Accordingly, the main characteristic value stored as the subcharacteristic value can be used as a newest main characteristic value at a changing time point.

BRIEF DESCRIPTION OF DRAWINGS

FIG. 1 is a block diagram showing the schematic construction of an information communication system for a vehicle in accordance with a first embodiment of the present invention.

BEST MODE FOR CARRYING OUT THE INVENTION

Figure 2:
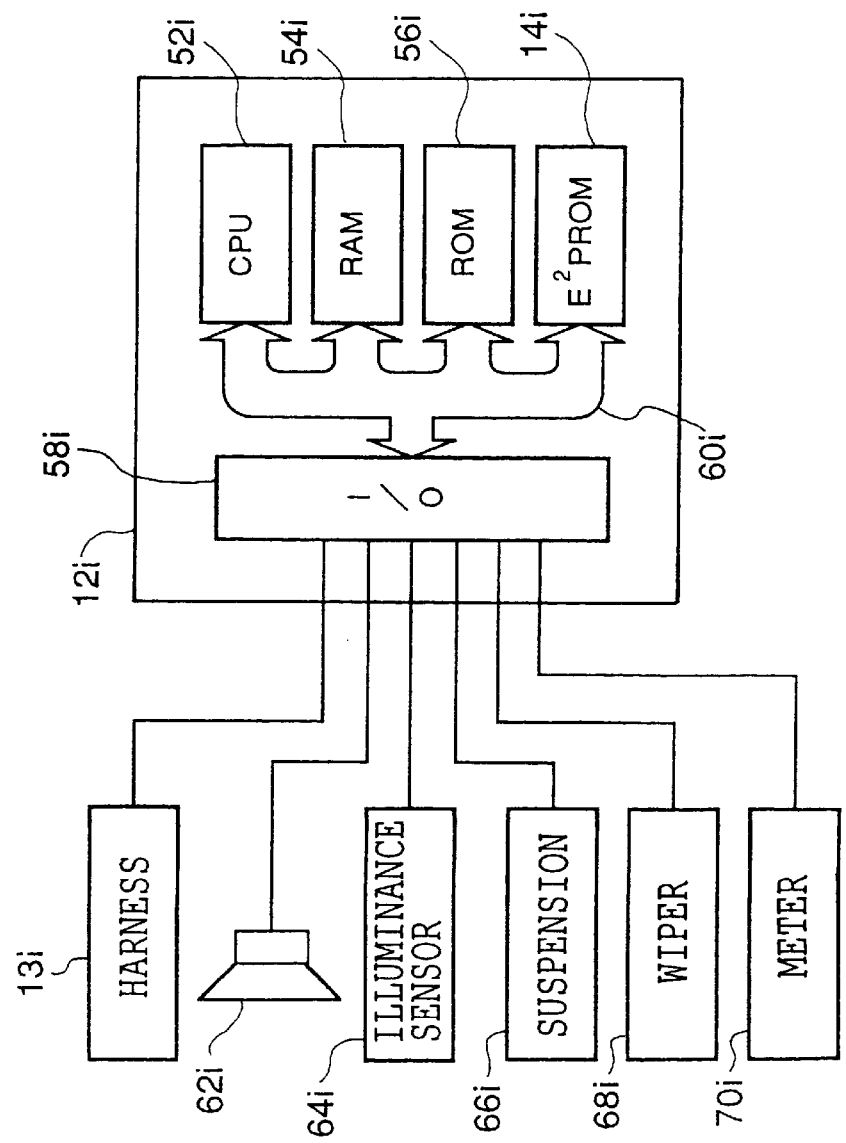
FIG. 2 is a view showing the schematic construction of an ECU mounted in a vehicle and the schematic construction of connected electronic devices.

One example of embodiments of the present invention will next be explained in detail with reference to the drawings.

First Embodiment

In this embodiment, the present invention is applied to an information communication system for a vehicle for changing the parameters for setting the conditions of an electronic device of the vehicle.

As shown in FIG. 1, the information communication system for a vehicle serving as a vehicle information communication device has a technology center 40 governing (controlling) general managing control. The technology center 40 comprises an unillustrated keyboard for inputting data and the like, a computer 44, a CRT 42 for displaying calculation results and the like of the computer 44, and a memory device 46 for accumulating and storing the vehicle information of many vehicles. The computer 44 comprises a CPU, ROM, and RAM. A program for performing statistical processing, communication processing and the like of the vehicle information is stored in the ROM in advance so that the statistical processing, the communication processing, and the like are performed. A plurality of information centers $30_1$, $30_2$,—, $30_m$ are connected to the technology center 40 by a data bus 38. A data bus determined by a standard such as ISO9141 may be used as the data bus.

The information center $30_1$ has a construction similar to that of the technology center 40. Namely, the information center $30_1$ comprises an unillustrated keyboard for inputting data and the like, a computer $34_1$, a CRT $32_1$ for displaying caluculation results of the computer $34_1$ and the like, and a memory device $36_1$ for accumulating and storing the vehicle information of many vehicles of a dealer governed by the information center $30_1$. The computer $34_1$ comprises a CPU, ROM, and RAM. A program for performing accumulation and summary processing, communication processing, and the like of the vehicle information is stored in the ROM in advance so that the accumulation and summary processing, the communication processing, etc. are performed. The other information centers $30_2$ to $30_m$ have constructions similar to the construction of the information center $30_1$ and their explanations are therefore omitted here.

Each of the plurality of information centers $30_1$ to $30_m$ is connected to one or a plurality of controlling dealers $20_1$, $20_2$,—, $20_n$ by a data bus. In the example of FIG. 1, the information center $30_1$ controls dealers $20_1$, $20_2$ and is connected to each of these dealers $20_1$, $20_2$ by a data bus $28_1$. The information center $30_1$ governs a dealer $20_n$ and is connected to this dealer $20_n$ by a data bus $28_m$.

The dealer $20_1$ has a construction similar to that of the technology center 40. Namely, the dealer $20_1$ comprises an unillustrated keyboard for inputting data and the like, a computer $24_1$, a CRT $22_1$ for displaying caluculation results and the like of the computer $24_1$, and a memory device $26_1$ for accumulating and storing vehicle information of many vehicles belonging to the dealer $20_1$. The computer $24_1$ comprises a CPU, ROM, and RAM. A program for performing accumulation and summary processing, communication processing and the like of the vehicle information is stored in the ROM in advance so that the accumulation and summary processing, the communication processing, and the like are performed. The other dealers $20_2$ to $20_n$ have constructions similar to the construction of the dealer $20_1$ and their explanations are therefore omitted here.

ECUs $12_i$, $12_j$,—, $12_k$ of vehicles $10_i$, $10_j$,—, $10_k$ can be connected to each of the dealers $20_1$, $20_2$,—, $20_n$ by a data bus. The ECU $12_i$ of the vehicle $10_i$ can be connected to the computer $24_1$ of the dealer $20_1$ by the data bus $16_1$. The many vehicles belonging to the dealer $20_1$ can have the ECU $12_i$ of each of these many vehicles $10_i$ connected to the data bus $16_1$.

As shown in FIG. 2, the ECU $12_i$ of the vehicle $10_i$ comprises a microcomputer comprising a CPU $52_i$, RAM $54_i$, ROM $56_i$ and an input/output port (I/O) $58_i$ each of which is connected to each other by a bus $60_i$ such that commands and data can be transmitted and received. An $E^2$PROM $14_i$ for storing parameters (characteristic values) for setting conditions (setting characteristics) of an electronic device of the vehicle $10_i$ is connected to this bus $60_i$.

A harness $13_i$ for connecting to the dealer $20_1$ via the data bus $16_1$ is connected to the input/output port $58_i$. An illuminance sensor $64_i$ is connected to this input/output port $58_i$. Further, a speaker device $62_i$, a suspension device $66_i$, a wiper device $68_i$ and a meter $70_i$ capable of having the conditions therefor set are connected as electronic devices for a vehicle to the input/output port $58_i$. Parameters whose conditions are to be set for each of the electronic devices are stored in the $E^2$PROM $14_i$. The type of vehicle can be also stored in the $E^2$PROM $14_i$.

The parameters whose conditions are to be set for each of the above electronic devices include the illuminance value of a light controller and the like operated by the illuminance sensor $64_i$, the sound volume for preventing theft generated from the speaker device $62_i$, the sound volume generated from the speaker device $62_i$ when the door is locked by a wireless control, the value for determining the hardness of the suspension device $66_i$, the operating timing (for example, the INT central value) of the wiper device $68_i$ during intermittent operation, the operating time of the wiper $68_i$, the brightness value of the meter when the meter $70_i$ itself is emitting light (this value is particularly effective when, for example, the amount of slanting incident light is large in particular countries and regions), the timing (length and illuminance) of a headlamp device, and the shift pattern of an automatic gear shift device. The parameters of a predetermined value are stored in the $E^2$PROM $14_i$, but this value can be adjusted by requests and commands of a user, requests and commands of a dealer, etc.

The other vehicles $10_j$, $10_k$ have constructions similar to the above construction of the vehicle $10_i$ and their explanations are therefore omitted here.

At least one of the above information center and the technology center functions as an accumulating means of the present invention. When the information center, or the information center and the technology center function as the accumulating means, the dealer constitutes a communication control means of the present invention. When the technology center functions as the accumulating means, the dealer and the information center constitute the communication control means of the present invention.

An operation of the vehicle information communication system in this embodiment will next be explained. In each of the vehicles $10_i$, $10_j$, $10_k$, parameters are set to be stored in each $E^2$PROM $14_i$ in advance.

Figure 3:
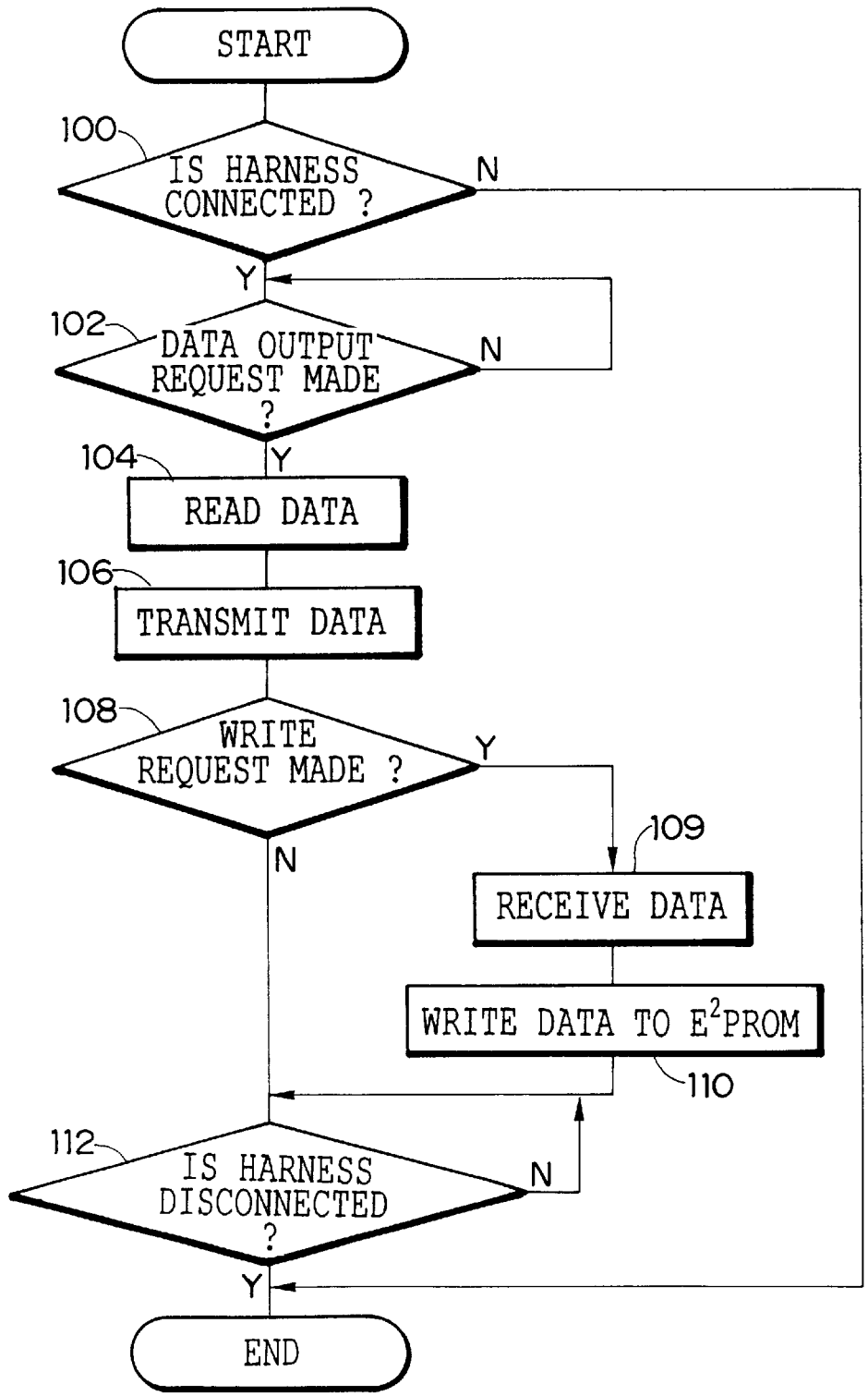
FIG. 3 is a flow chart showing a flow of parameter processing executed by the ECU of the vehicle.

The vehicle $10_i$ is held by the dealer responsible which this, i.e., the dealer $20_1$ during road-worthiness inspections, repairs, and the like. When the vehicle $10_i$ held by the dealer has a harness $13_i$ thereof connected to an ECU $12_i$ by a connector through the operation of the dealer, the ECU $12_i$ is set to a checking mode and the parameter processing routine of FIG. 3 is executed in the ECU $12_i$. In step 100 of FIG. 3, it is judged whether or not the harness connection is correctly made. If the harness connection is not correctly made and a negative judgment is made, this routine is terminated. If, the harness connection is made and an affirmative judgment is made in step 100, the existence or nonexistence of a data output request signal from the connected dealer $20_1$ is judged in the next step 102, thus determining whether or not data is requested. The vehicle information communication system is on standby until this data request is made (a negative judgment in step 102). When the data request is made (an affirmative judgment in step 102), data is read by reading the parameters stored in the $E^2PROM$ $14_i$ in the next step 104. The read data (parameters) is transmitted to the dealer $20_1$ through the data bus $16_1$ in the next step 106. The parameter added the information of the type of vehicle thereto may be also transmitted as vehicle information (data) by storing the type of vehicle in the $E^2PROM$ $14_i$.

Next, it is judged in step 108 whether or not a write request signal is outputted from the dealer $20_1$. This write request signal is a signal showing whether data (described later in detail) from the dealer $20_1$ for updating the parameters stored in the vehicle $10_i$ is received or not. When the write request signal is received and an affirmative judgment is made in step 108, this data is received in the next step 109 and is stored in the $E^2PROM$ $14_i$ in the next step 110 with the received data serving as data containing the newest parameters. In contrast to this, when no data is received and a negative judgment is made in step 108, the routine proceeds with no change to step 112. In step 112, the vehicle information communication system is on standby until the harness $13_i$ is separated (a negative judgment in step 112). When the harness $13_i$ is separated from the above ECU, this routine is terminated.

Thus, in the vehicle, the data from the dealer, i.e., the newest parameters can be stored in the $E^2PROM$ $14_i$ of the vehicle by performing communication processing between the vehicle and the dealer.

Processing in each of the vehicles $10_j$, $10_k$ is similar to the processing performed in the above vehicle $10_i$ and its explanation is therefore omitted here.

Processing performed in the dealer $20_1$ will next be explained.

Figure 4:
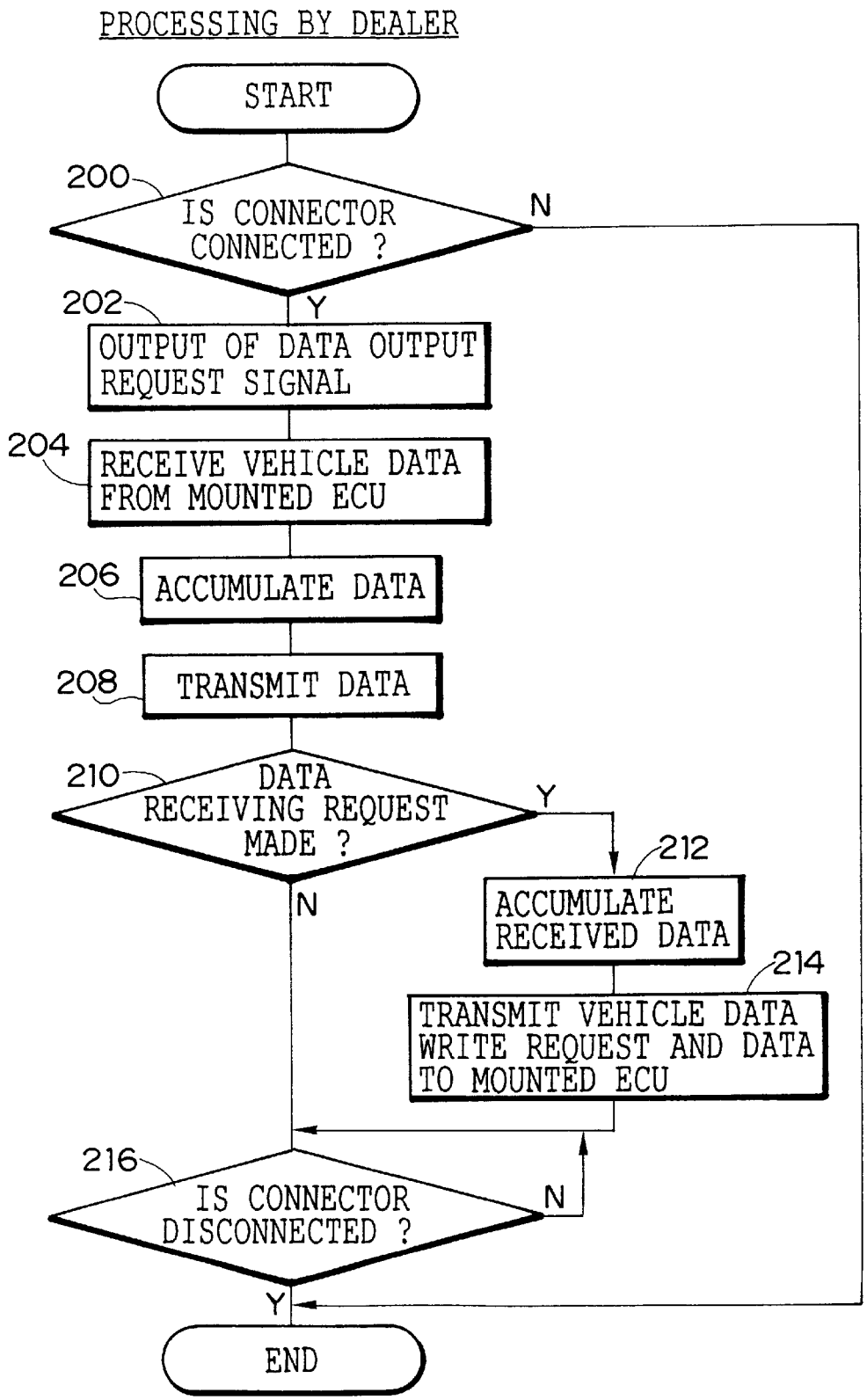
FIG. 4 is a flow chart showing a flow of checking processing executed by a computer of a dealer.

First, when the vehicle $10_i$ is held by the dealer $20_1$, an operator connects the computer $24_1$ and the ECU $12_i$ of the vehicle $10_i$ to each other by a connector, sets the checking mode by a keyboard operation, and inputs information concerning the type of the vehicle $10_i$. Thus, the checking processing routine of FIG. 4 is executed in the computer $24_1$. The type of vehicle $10_i$ may be also set to be read from data described later.

In step 200 of FIG. 4, it is judged whether the connector is correctly connected or not. If the connector is not correctly connected and a negative judgment is made, this routine is terminated. In contrast to this, if the connector is correctly connected and an affirmative judgment is made in step 200, a data output request signal showing a request for outputting parameters is outputted to the connected ECU $12_i$ of the vehicle $10_i$ in the next step 202. In the next step 204, the parameters stored in the $E^2PROM$ $14_i$ of the vehicle $10_i$ are read by reading data transmitted from the vehicle $10_i$. The read data (parameters) is accumulated in a memory device $26_1$ together with the information on the type of vehicle in the next step 206. A large amount of vehicle information comprising the parameters and the information on the type of the vehicle $10_i$ belonging to the dealer $20_1$ is stored in the memory device $26_1$ of the dealer $20_1$ by this data accumulation. In the next step 208, a communication request signal is outputted and the vehicle information, with the information on the type of vehicle added to the data read in the above step 204, is transmitted as data to the information center $30_1$ through the data bus $26_1$. In this step 208, dealer information concerning the dealer $20_1$ itselfs may be added to the data transmitted to the information center $30_1$.

Next, it is judged in step 210 whether a data receiving request signal from the information center $30_1$ is outputted or not. This data receiving request signal is a signal showing a request in which data (described later in detail) from the information center $30_1$ is received by the dealer $20_1$. If no data receiving request signal is received and a negative judgment is made in step 210, the routine proceeds to step 216. In contrast to this, if the data receiving request signal is received, data is received and accumulated in the memory device $26_1$ in step 212. In this accumulation, the received data may be further added as newest data to data already accumulated, or the data already accumulated may be also rewritten as the received data. Since this data is the vehicle information comprising the type of vehicle and the parameters, this data may be also classified and accumulated in accordance with the type of vehicle. In the next step 214, a write request signal is outputted and data for writing to the ECU of the vehicle is outputted and the routine proceeds to step 216. In step 214, only the parameters may be outputted. The data received in the above step 212 may be also set as data about only the dealer $20_1$ in which no data relative to the vehicle $10_i$ are included. In this case, the data received in the step 212 is merely accumulated in the memory device $26_1$ and the routine proceeds to step 216. In the next step 216, it is judged whether the connector is disconnected or not. If the connector is disconnected and an affirmative judgment is made, the routine is terminated.

Thus, since the dealer accumulates data comprising the type of vehicle and the parameters read from the vehicle, the transition of the parameters of the vehicles belonging to the dealer can be predicted by referring to this accumulated time-wise hysteresis. Further, the present parameters can also be grasped.

Processing in each of dealers $20_2$ to $20_n$ is similar to the above processing performed for the dealer $20_1$ and its explanation is therefore omitted here.

Processing performed in the information center $30_1$ will next be explained. In the information center $30_1$, the information collecting processing routine of FIG. 5 is executed in the computer $24_1$ at regular predetermined times.

The dealer $20_1$ connected to the information center 30, transmits data comprising the parameters with the information on the type of vehicle read from the $E^2PROM$ $14_i$ of the vehicle $10_i$ to the information center $30_1$ in checking processing (FIG. 4) in the checking mode when the vehicle $10_i$ is held in stock as mentioned above (step 208).

Figure 5:
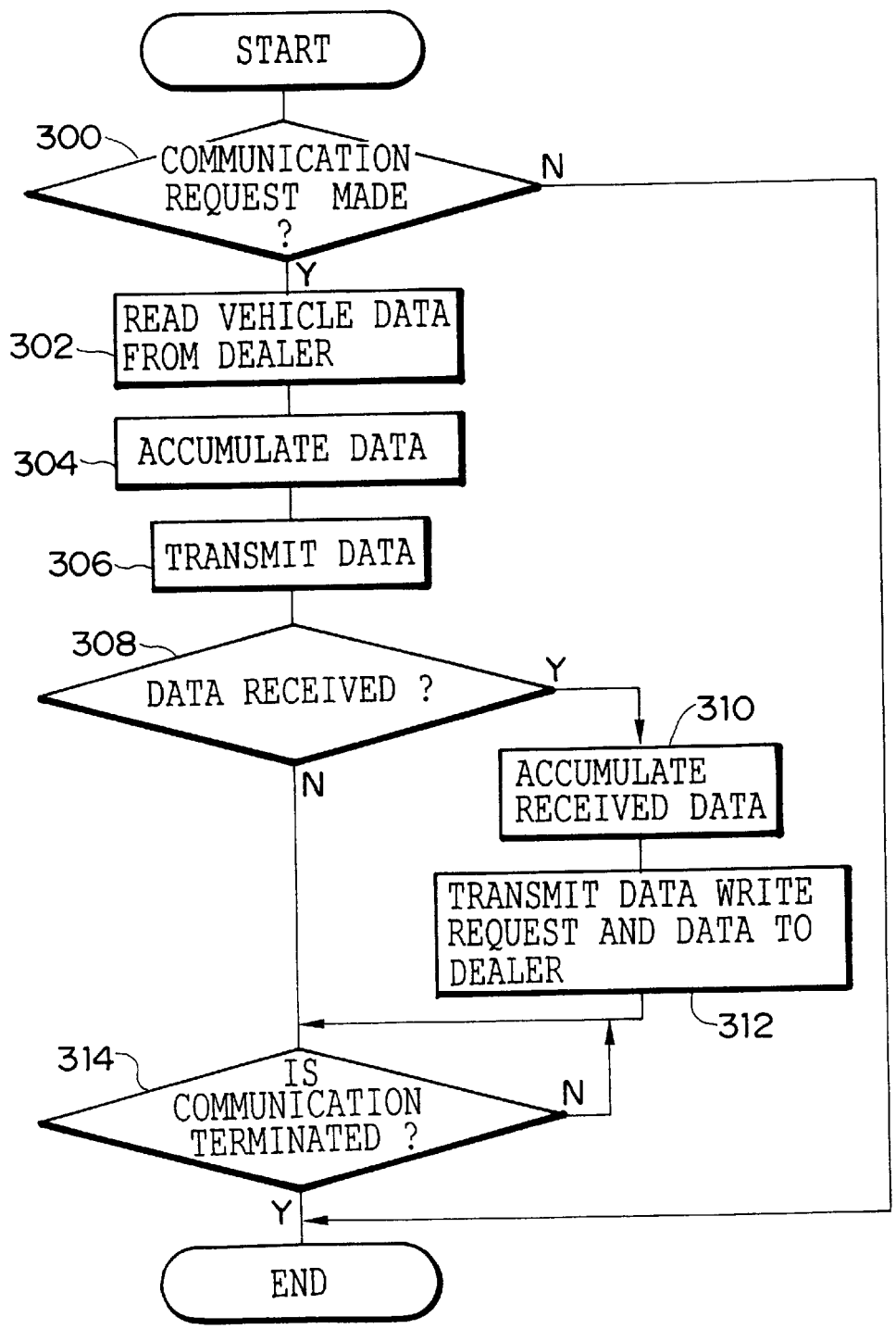
FIG. 5 is a flow chart showing a flow of information collecting processing executed by the computer of an information center.

In step 300 of FIG. 5, it is judged whether or not a communication request is made by the existence or nonexistence of the communication request signal from the dealer $20_1$. If there is no communication request, this routine is terminated. In contrast to this, when the communication request is made, the routine proceeds to step 302. In step 302, data transmitted from the dealer $20_1$ is read. The read data is accumulated in a memory device $36_1$ in the next step 304. Vehicle information of many dealers governed by the information center $30_1$ is stored by this data accumulation in the memory device $36_1$ of the information center $30_1$. Accordingly, the vehicle information of the dealers governed by the information center, i.e., the type of vehicle and the parameters can be accumulated. When dealer information is added to the data read in the step 302, this data is preferably classified and accumulated for every dealer. In the next step 306, the communication request signal is outputted and the data read in the above step 302 is transmitted to the technology center 40 via a data bus 38.

Next, it is judged in step 308 whether a data receiving request signal is outputted from the technology center 40 or not. This data receiving request signal is a signal showing a request in which data (described later in detail) from the technology center 40 is received by the information center $30_1$. When no data receiving request signal is received and a negative judgment is made in step 308, the routine proceeds to step 314. In contrast to this, if the data receiving request signal is received, data is received and accumulated in the memory device $36_1$ in step 310. In this accumulation, the received data may be further added as newest data to data already accumulated, or the data already accumulated may be also rewritten as the received data. Since this data is vehicle information comprising the type of vehicle and the parameters, this data may be also classified and accumulated in accordance with the type of vehicle. In the next step 312, a data write request signal is outputted and data for writing to the memory device of the dealer is outputted and the routine proceeds to step 314. The data received in the above step 310 may be set as data about only the dealer $20_1$ with no data concerning the vehicle $10_i$ included. Alternatively, the data received in the above step 310 may be set as data about only the information center with no data concerning the dealer included. In this case, the data received in the step 310 is merely accumulated in the memory device $36_1$ and the routine proceeds to step 314. In this step 314, it is judged whether communication is terminated or not. When an affirmative judgment is made and communication is terminated, this routine is terminated.

Thus, the information center accumulates data comprising the type of vehicle and the parameters read from vehicles belonging to the dealers governed by the information center. Accordingly, the transition of the parameters of the vehicle belonging to the dealer can be predicted for each dealer by referring to this accumulated time-wise hysteresis. Further, the current parameters can be also understood for each dealer.

Processing in each of information centers $30_2$ to $30_m$ is similar to the processing performed in the above information center $30_1$ and an explanation is therefore omitted here.

Processing performed in the technology center 40 will next be explained. In the technology center 40, the information statistic processing of FIG. 6 is executed in the computer 44 at regular predetermined times.

As mentioned above, the information center $30_1$ connected to the technology center 40 transmits data read from the dealer governed by the information center $30_1$ (step 306). Since one or a plurality of dealers can be connected to the information center, data read from one or a plurality of dealers can be also transmitted.

Figure 6:
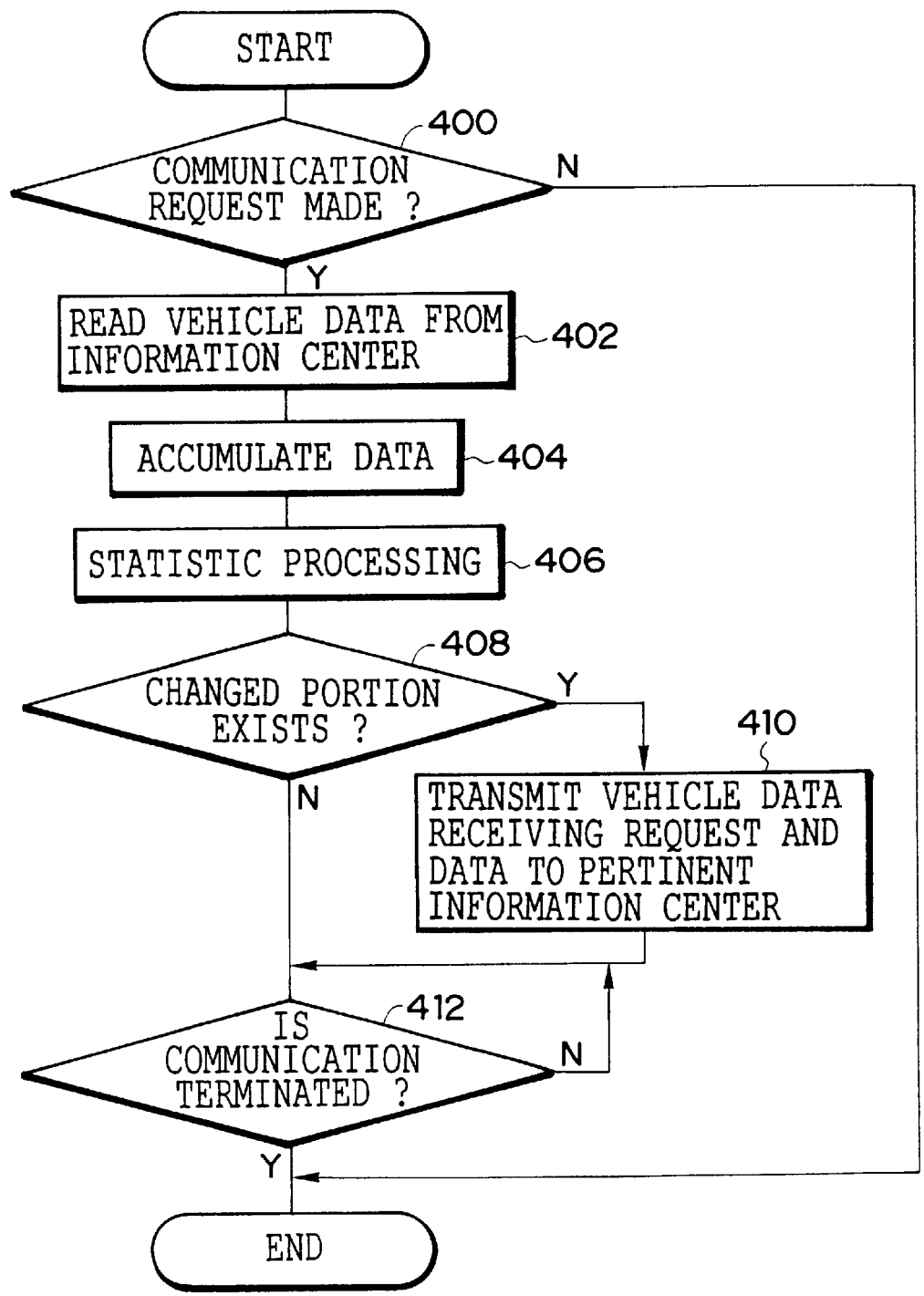
FIG. 6 is a flow chart showing a flow of information statistics processing executed by the computer of a technology center.

In step 400 of FIG. 6, it is judged whether a communication request is made from the information center $30_1$ or not. When there is no communication request and a negative judgment is made, this routine is terminated. In contrast to this, when the communication request is made and an affirmative judgment is made in step 400, the routine proceeds to step 402. In this step 402, data transmitted from the information center $30_1$ is read. The read data is accumulated in a memory device 46 in the next step 404. The vehicle information of the multitude of dealers governed by all the information centers is stored by this data accumulation in the memory device 46 of the technology center 40. In the next step 406, statistic processing is performed using the data read in the above step 402 and the obtained data is stored. This statistic processing is processing for calculating the newest and optimum parameters from the accumulated data, i.e., the type of vehicle and the parameters. The newest and optimum parameters are (may be) parameters showing a group of the accumulated data, e.g., parameters having high frequency or parameters having averaged, and parameters which are estimated as being currently optimum parameters calculated from the varying tendencies of parameters which are determined from the time-wise transition. These parameters may of course be calculated in accordance with the type of vehicle or may also be calculated for all types of vehicles.

Next, it is judged in step 408 whether or not there is a changing portion in the data of the vehicle information after statistic processing is done. When there is no changing portion and a negative judgment is made in step 408, the routine proceeds to step 412. In contrast to this, when there is a changing portion, a data receiving request signal and the data are outputted to the pertinent information center in step 410, and the routine proceeds to step 412. In step 412, it is confirmed whether communication is terminated or not. If communication is terminated, this routine is terminated.

In the above description, the statistic processing including the vehicle information from the vehicle is performed, but the present invention is not limited to this case and data not including the received vehicle information may also be calculated to give optimum or newest data and outputted to the vehicle. Namely, data statistically processed using the vehicle information accumulated for all vehicles up until the current vehicle may be calculated as optimum or newest data, and outputted to the vehicle. In this case, when the vehicle information is received, data based on the vehicle information up until the current vehicle which is stored in advance may be outputted to this vehicle.

Thus, in this embodiment, parameters for setting conditions of an electronic device stored in the vehicle are transmitted to the technology center through the dealer and the information center. Thus, characteristic values for electronic control of each vehicle can be collected in the technology center on the basis of information of many vehicles. Further, since the newest and optimum vehicle information is transmitted from the technology center to the vehicle, each vehicle can update the parameters thereof to the newest and optimum parameters.

Moreover, by collecting the characteristic values of the vehicles belonging to each of the dealer, the information center, and the technology center, or of the vehicles governed by each of the dealer, the information center, and the technology center, or of all vehicles, which characteristic values are used for the electronic control of each vehicle at each of the dealer, the information center, and the technology center, parameters appropriate to each user's tastes in the future can be predicted to a certain extent, and newest parameters can be set in every section. Accordingly, the newest parameter information can be reflected for the user of the individual vehicle.

Further, while the vehicle is held in stock by the dealer, each of the dealer, the information center and the technology center can collect data so that the vehicle information can be collected at an early stage. Further, when the vehicle is held in stock by the dealer, etc., the parameters can be updated. Accordingly, the parameters can be updated without detaching the ECU from the vehicle. Thus, the parameters of the vehicle can be set to the newest parameters, i.e., specifications.

In the above embodiment, the electronic device is connected to a controller of the vehicle, but the present invention is not limited to this and can also be applied to a multiplex communication device for a vehicle in which a LAN for the vehicle is constructed by connecting a plurality of ECUs to each other via a bus. Further, the communication between the vehicle, the dealer, the information center and the technology center may suitably use wireless communication.

Second Embodiment

In the first embodiment, the present invention is applied to an information communication system for a vehicle for changing the parameters for setting conditions of electronic devices of the vehicle and connected to the dealer through the data bus $16_i$ connected to the ECU $12_i$ of the vehicle. However, it has become possible recently to externally transmit and receive information by mobile body communication (e.g., wireless communication) from the vehicle thanks to the rapid development of mobile body communication systems.

Therefore, in this second embodiment, the present invention is applied to an information communication system for a vehicle for maintaining and changing parameters for setting conditions of an electronic device of a vehicle by wireless communication. In this embodiment, the information communication system has a construction approximately similar to that of the above embodiment. Therefore, a detailed explanation of this construction is omitted here by designating the same reference numerals to the same portions as the first embodiment.

Figure 7:
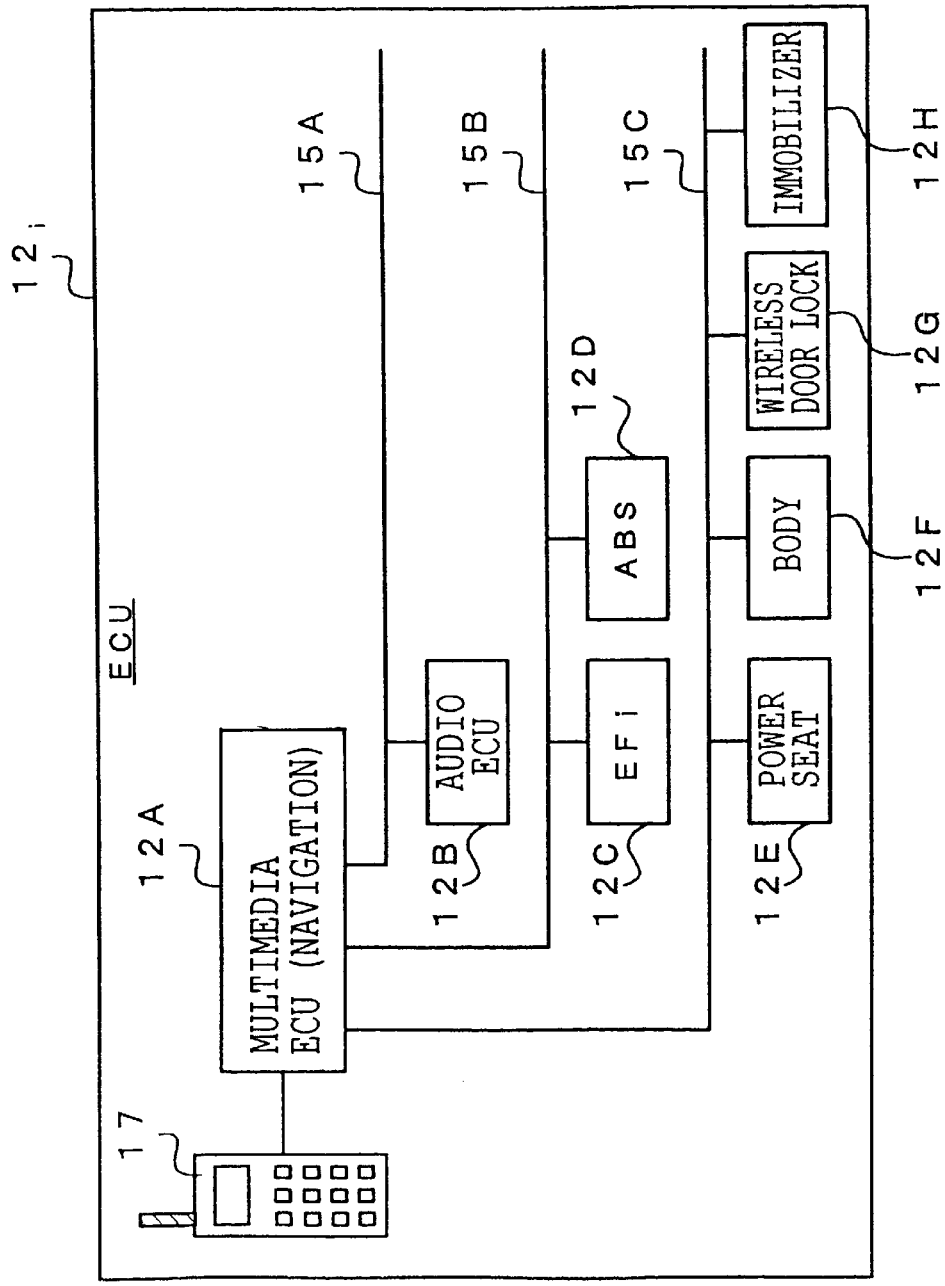
FIG. 7 is a block diagram showing the schematic construction of an ECU of an information communication system for a vehicle in accordance with a second embodiment of the present invention.

As shown in FIG. 7, an ECU $12_i$ of a vehicle $10_i$ comprises a microcomputer as mentioned above (see FIG. 2) and, specifically, comprises a plurality of ECUs for controlling the operation of the electronic devices governed by the ECUs. In this embodiment, the ECU $12_i$ comprises an ECU 12A for multimedia for generalizing media such as pictures, sounds, etc., an ECU 12B for audio, an ECU 12C (EFi) for engine control, an ECU 12D for an antilock brake system (ABS), an ECU 12E for a power seat, an ECU 12F for electric equipment of the vehicle body, an ECU 12G for a wireless door lock system, and an ECU 12H for an immobilizer for preventing theft, etc. The ECU 12A for multimedia is set to be also used as the ECU of a navigation system.

An audio system LAN 15A, a vehicle control system LAN 15B and a body system LAN 15C are connected to the ECU 12A. The ECU 12B is connected to the audio system LAN 15A. The ECU 12C and the ECU 12D are connected to the vehicle control system LAN 15B. The ECU 12E, the ECU 12F, the ECU 12G and the ECU 12H are connected to the body system LAN 15C.

A mobile body communication device 17 is connected to the ECU 12A and is known as a so-called portable telephone for performing a connection with a dealer $20_1$, etc. via a telephone circuit.

Each of the above ECUs has a memory (generally called an E$^2$PROM $14_i$ in FIG. 2) for storing parameters (characteristic values) for setting conditions (setting characteristics) of each of the electronic devices of the vehicle $10_i$ although this memory is unillustrated in the drawings. One example of these characteristic values is shown in the following Table 1.

TABLE 1

| ECU | Held information |
| --- | --- |
| EFi | Individual parameters |
| ABS | Individual parameters |
| Audio | Preset radio station list |
|  | CD music name register information |
|  | FM multiplex stored data |
| Multimedia | Telephone directory list |
|  | Navigation |
|  | spot register data |
|  | path data |
|  | display condition setting |
| Power seat | Position information |
| Body | Autolock mode |
| Wireless door lock | ID code |
|  | (applicable to a new car in the case of electronic key) |
| Immobilizer | ID code |
|  | (applicable to a new in the case of electronic key) |

The other vehicles $10_j$, $10_k$ have constructions similar to the above construction of the vehicle $10_i$ and their explanations are therefore omitted here.

At least one of the dealer $20_i$, the information center $30_i$ and the technology center 40 is connected to a telephone line through the mobile body communication device 17 of the vehicle so as to transmit and receive information between the vehicle and at least one of the dealer $20_i$, the information center $30_i$ and the technology center 40 although this construction is not illustrated in the drawings.

Further, in this embodiment, the parameters (characteristic values) stored in the above ECUs, the type of vehicle and information relative to the vehicle as in the above table are generally called vehicle information.

In recent years, online information providing services have appeared for providing various kinds of information online such as a weather forecast, traffic jam information, and the like. is realized. A wireless transmitting path such as a telephone circuit can be used in this online information providing service. A large amount of various kinds of information can be obtained online by providing a mobile body communication device (a portable telephone, etc.) within the vehicle. The wireless transmitting path used in the online information providing service is normally formed in a full duplex system as represented by a telephone.

In this case, when a request is made that the desired information be provided from a terminal (the vehicle in this embodiment) to an information provider and the data amount of this information is large, only confirmation (e.g., transmission of ACK/NACK commands) for retransmission control is performed in the information transmitting direction from the vehicle to the information provider during the provision of the large information amount (called a "download") from the information provider to the terminal (the vehicle in this embodiment). Accordingly, in the information transmitting direction from the vehicle to the information provider, the information communication system is substantially in an unused state so that there is free space in the communication capacity.

The inventors, etc. in this application have noticed that there is free space in communication capacity in the approximately unused state during the above download period. Further, the inventors have found that the total information amount in transmission and reception of information can be increased by detecting and using this period when free space is provided and bidirectionally transmitting and receiving information within this period without increasing the communication costs of a user.

In this embodiment, automatic backup processing of the vehicle information is achieved for the period when free space is provided. It is possible to restore information registered in the previous vehicle by this automatic backup processing when a replacement vehicle is purchased or when ECUs are exchanged. Further, if a format converting function of the vehicle information is prepared by the information provider, old information from a different vehicle maker and type of device can also be converted and set.

Operation of the information communication system in this embodiment will next be explained. In the following explanation, a technology center 40 is connected as one example to a telephone circuit through a mobile body communication device 17 of the vehicle so as to transmit and receive information between the technology center and the vehicle. Further, a vehicle information storing area is determined in advance in the technology center 40 in this embodiment so as to hold backup data described later for each user.

Figure 8:
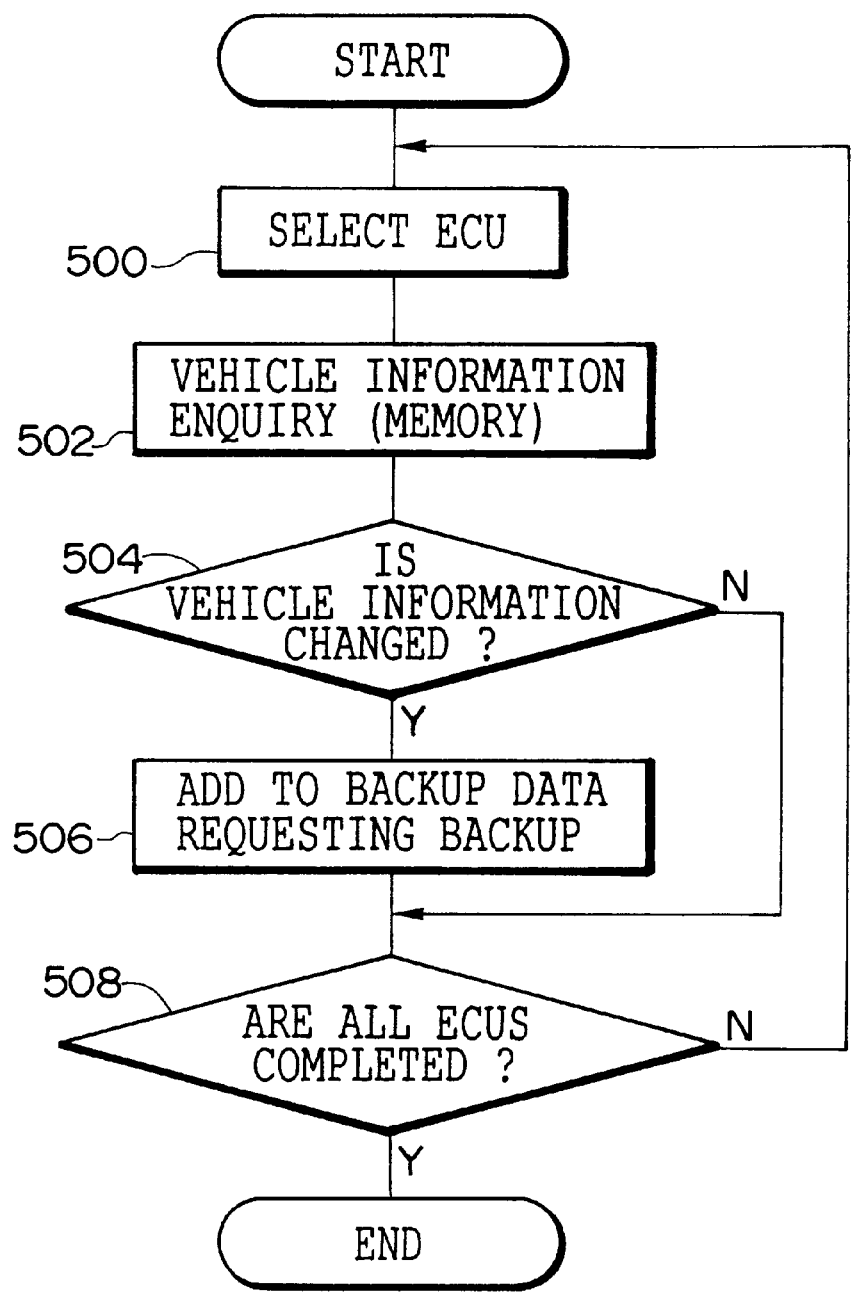
FIG. 8 is a flow chart showing a flow of normal backup processing executed by an ECU of the vehicle.

The ECU 12A first executes an interruption routine shown in FIG. 8 at regular predetermined times so as to maintain vehicle information such as information held in each ECU, information registered by a user, data learned by a driving experience of the user, etc. as newest information. In the following explanation, as described later, the ECU 12A stores vehicle information which is enquired about and can use the stored vehicle information as the vehicle information previously enquired about at the next interruption processing time.

In step 500 of FIG. 8, one ECU among the ECUs 12A to 12H constituting the ECU $12_i$ of the vehicle $10_i$ is selected. In the next step 502, an enquiry is made for vehicle information held in the selected ECU. Note that in some cases the ECU 12A stores the vehicle information in its own memory and accordingly, in these steps 500 and 502, the ECU 12A can be set to select and make an enquiry of itself.

In the next step 504, it is judged whether the vehicle information enquired about in the above step 502 is changed from the vehicle information previously enquired about or not. When the vehicle information is not changed, a negative judgment is made in step 504 and the routine proceeds to step 508. In contrast to this, when the vehicle information is changed, an affirmative judgment is made in step 504. In the next step 506, the above read (changed) vehicle information is added to backup data and the routine then proceeds to step 508.

The backup data is stored with the type and format of the changed vehicle information stored as attributes together with its contents. For example, 1) a telephone directory list, 2) navigation location registering data, 3) navigation route data, and 4) navigation display conditions of are set in the ECU 12A for multimedia in the example shown in the above table 1. The type of the vehicle information can be shown by a sequential order of the ECU 12A of multimedia and sequential orders of 1) to 4) as this vehicle information and its data form can be set to a format. The backup data can be easily generated by adding the format thereof and the type of these vehicle information as attributing headers to the contents of the vehicle information.

In the next step 508, it is judged whether or not the above processing is terminated with respect to all ECUs constituting the ECU $12_i$. When an unprocessed ECU remains, the routine returns to step 500 and the above processing is repeated. In contrast to this, when the above processing is terminated with respect to all the ECUs, an affirmative judgment is made in step 508 and this interruption routine is terminated.

Thus, newest vehicle information is maintained in the ECU 12A by periodically executing this interruption routine. Namely, communication with a connected electronic device within the vehicle is periodically executed and it is confirmed whether the vehicle information such as parameters, etc. are changed or not. When the vehicle information is changed, this vehicle information is updated and maintained as newest vehicle information.

Next, processing in the vehicle, i.e., in the ECU will be explained when backup processing of the vehicle information such as parameters of the electronic devices of the vehicle, etc. is performed by wireless communication. When various kinds of services are received online, a connection is confirmed as is well known to authenticate that the recipient is able to receive the various kinds of services. In this embodiment, general communication protocol settings and authentication using the presentation of a log-in ID and a password will be explained as a log-in procedure.

Figure 9:
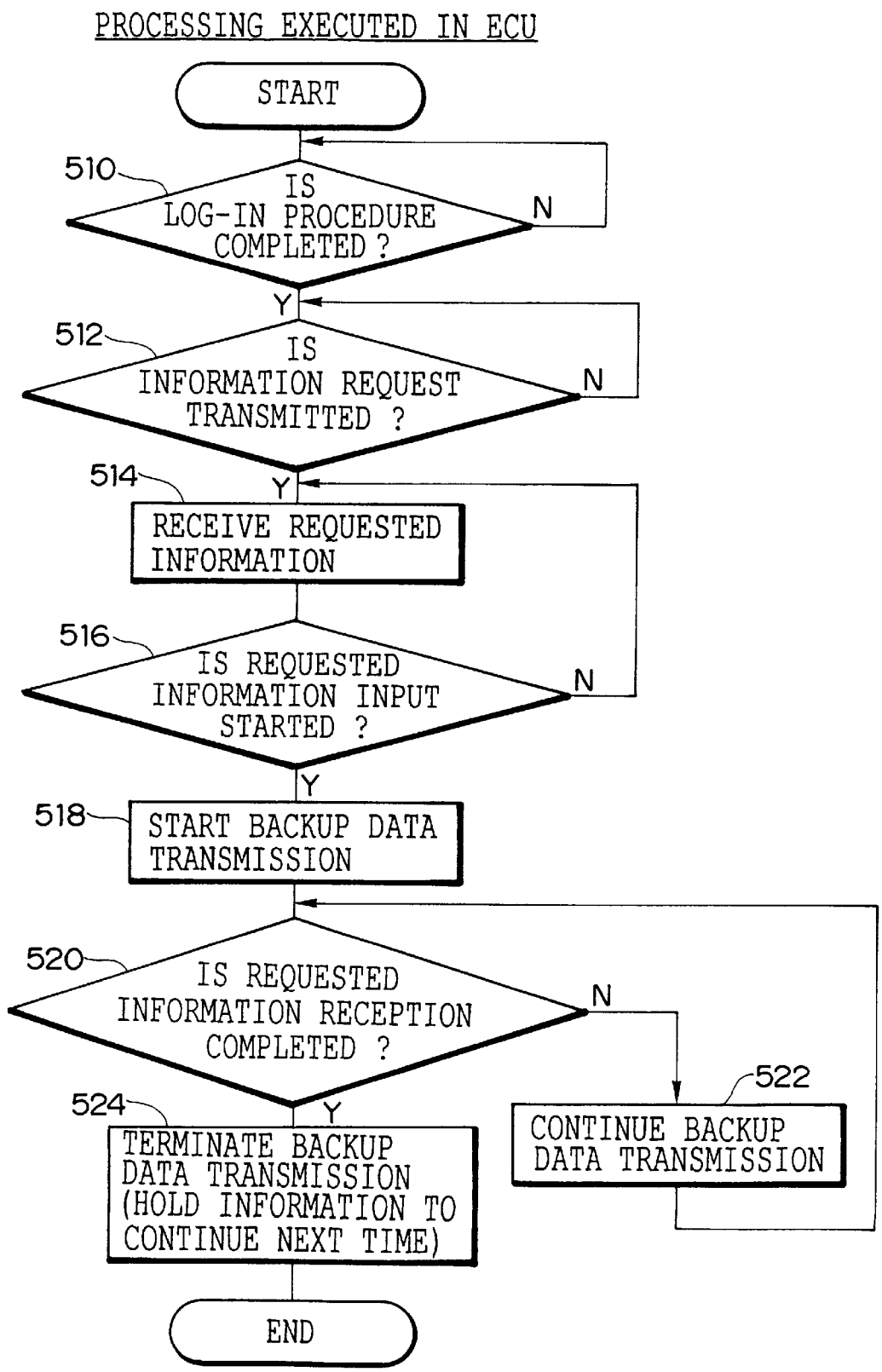
FIG. 9 is a flow chart showing a flow of backup processing executed at a time of online information receiving processing executed by an ECU of the vehicle.

The processing routine of FIG. 9 is executed when a predetermined operation (instructions from an input device such as a keyboard, etc. and command instructions from a navigation system, etc.) is performed by a user to obtain information provided online such as a weather forecast, traffic information, etc. This predetermined operation is set to include input processing of a telephone number to be connected, line connecting processing and the log-in procedure.

In step 510 of FIG. 9, it is judged whether the above log-in procedure is completed or not. Step 510 is repeatedly executed until the log-in procedure is completed. When the log-in procedure is completed, an affirmative judgment is made in step 510 and the routine proceeds to step 512. In step 512, it is judged whether a signal showing a request for information (online information) obtained online is transmitted or not. The judgment in step 512 is repeated until this signal showing the information request is transmitted. When this transmission is completed, an affirmative judgment is made in step 512. Judgments of requested information received in the next step 514 and start of requested information reception in step 516 are repeated until the requested online information is received.

When the requested online information is received, an affirmative judgment is made in step 516. In the next step 518, transmission of the above stored backup data (step 506 in FIG. 8) begins. In this transmission, the backup data is transmitted by adding the format and the type of the vehicle information as attributing headers to contents of the vehicle information.

In the next step 520, it is judged whether reception of the requested online information is completed or not. When the reception of the requested online information is not completed, a negative judgment is made in step 520 and the transmission of the backup data is continued in the next step 522 and the routine then returns to the step 520. In contrast to this, when the reception of the online information is completed, an affirmative judgment is made in step 520 and the transmission of the backup data is terminated in the next step 524.

In step 524, there are cases in which the transmission of the backup data is not completed. In this case, the backup data is verified as far as the point in time of the completion of the transmission, and untransmitted backup data is transmitted next time. Therefore, the untransmitted backup data serving as continuous information is stored as new backup data.

Figure 10:
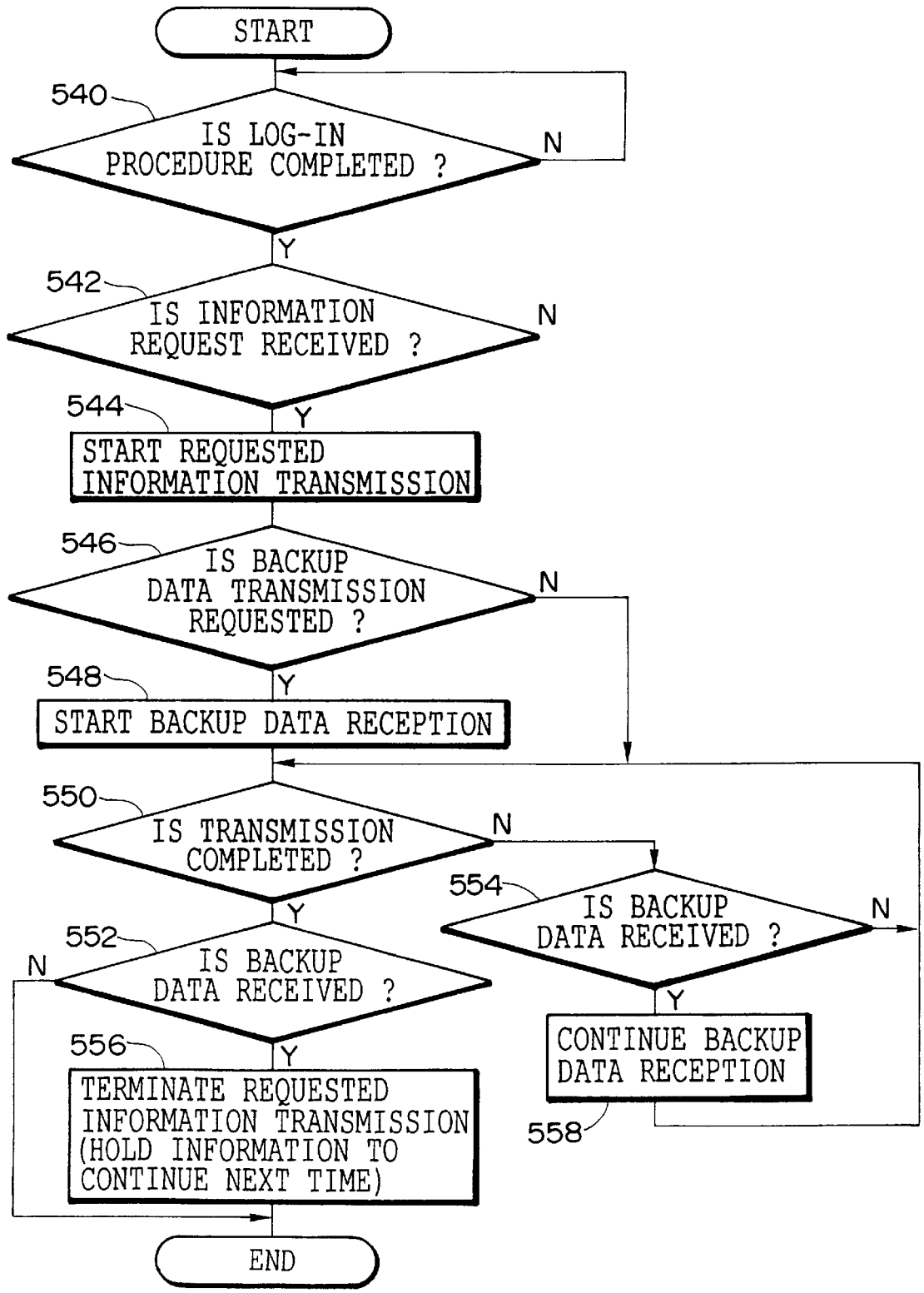
FIG. 10 is a flow chart showing a flow of backup processing executed by the computer of a technology center.

Next, the processing routine shown in FIG. 10 is executed in the technology center 40 to perform backup processing of the vehicle information held in each ECU of the vehicle in the technology center 40. In step 540, it is judged whether the log-in procedure with respect to the above vehicle is completed or not. Step 540 is repeatedly executed until the log-in procedure is completed. When the log-in procedure is completed, an affirmative judgment is made in step 540 and the routine proceeds to step 542. In step 542, it is judged whether a signal showing a request information of online information is received or not. The judgment in step 512 is repeated until the signal showing the request information is transmitted. When this transmission is completed, an affirmative judgment is made in step 542. In the next step 544, transmission of the requested online information is started.

When the transmission of the requested online information is started, it is judged in the next step 546 whether the above backup data is received or not. Thus, it is judged whether a request to transmit the backup data is made or not. When a request to transmit the backup data is made, an affirmative judgment is made in step 546. In the next step 548, reception of the backup data is started. In contrast to this, if a negative judgment is made in step 546, the routine proceeds to step 548.

In the next step 550, it is judged whether the transmission of the requested online information started in step 544 is completed or not. If the transmission of the requested online information is completed, a negative judgment is made in the step 550. It is judged in the next step 554 whether the backup data is received in the above steps 546 and 548 or not. If the backup data is not received, a negative judgment is made in step 554 and the routine returns to step 550. In contrast to this, when the backup data is received, an affirmative judgment is made in step 554, the reception of the backup data is continued in the next step 558, and the routine returns to step 550. The received backup data is stored and held in a predetermined vehicle information storage area of the technology center 40. In contrast to this, when the transmission of the online information is completed, an affirmative judgment is made in step 550 and it is next judged in step 552 whether the backup data is received in the above steps 546 and 548 or not. If the backup data is not received, a negative judgment is made in step 552 and this routine is terminated. In contrast to this, when the backup data is received, an affirmative judgment is made in step 552, the transmission of the online information is terminated in the next step 556, and this routine is terminated.

There are cases in which the reception (storage) of the backup data is not completed in step 556. In this case, the backup data is recognized until the point in time when the reception is completed, and the position of the backup data is stored so that unreceived backup data may be continuously received and stored the next time. Namely, continuous information showing further continuation of data is added to the end or the like of the backup data already received as continuous information.

In the above description, if the transmission/reception (storage) of the backup data is not completed, the uncompleted backup data is transmitted/received (stored) the next time. However, if the backup data is not completely transmitted/received (stored), all the backup data may be again stored in the ECU and may be again transmitted/received (stored) the next time.

Thus, in this embodiment, when various kinds of online information such as weather forecasts, road information, etc. are requested from the vehicle and are received by a full duplex system or the like, parameters (characteristic values) for setting conditions (setting characteristics) of each electronic device in the vehicle is stored as backup data in communication with the vehicle exterior by using an information flowing path in an approximately unused state from the vehicle having free space in the communication capacity thereof to the information provider. Therefore, the information can be transmitted and received bidirectionally within the period when this free space is provided. Accordingly, the communication load of a user can be reduced without increasing the communication costs of the user, and the total amount of transmitted and received information can be increased.

Further, the parameters (characteristic values) for setting the conditions (setting characteristics) of each of the electronic devices of the vehicle can be held as backup data every time the online information required by the user is received. Accordingly, the backup frequency of the information can be improved in comparison with when the vehicle is taken to a dealer, etc. and the characteristic values are held. Therefore, newest information can be easily secured without intentionally holding the newest information by the user.

In recent years, cases where a plurality of ECUs are mounted in a vehicle are increasing and there are various kinds of parameters (characteristic values) for setting the conditions (setting characteristics) of the electronic devices of the above vehicles. Recently, devices often individually used by users such as a mobile body communication device and a navigation system are often mounted on the vehicle. In the mobile body communication device and the navigation system, there are cases in which individual data of a telephone directory, destination data of navigation, etc. can be set. When such individual data is set, no backup data is externally stored so that the individual data must be reset when an ECU is defective or is exchanged. In this embodiment, the vehicle information can be stored and held in the technology center for each individual. Accordingly, it is not necessary to reset the individual data when the ECU is defective or is exchanged. Further, the parameters (characteristic values) can be easily reregistered in conformity with the existing state by using the vehicle information held in the technology center.

In this embodiment, the format and the type of the vehicle information are determined as explained above when backup of the vehicle information is automatically made in the period when the free space is provided. Namely, the format thereof and the type of the vehicle information being changed as attributes are stored together with their contents as backup data. Therefore, the format thereof and the type of the vehicle information can be obtained with respect to the stored backup data so that the vehicle information can be individually obtained. For example, when a new car having different types of devices (a different model of car) is purchased, characteristic values provided by backup data can be easily reflected in this new car. Namely, the backuped vehicle information can be individually used so that a format converting function for converting the vehicle information can be easily determined in accordance with the maker of this car and the car kind. Accordingly, old information with respect to a different maker and device type can be converted and set by this format converting function.

There is an ECU having a self diagnostic function and capable of holding diagnostic results as data (so-called diagnostic information). The information communication system for a vehicle in this embodiment is suitable for a vehicle having such an ECU capable of holding the diagnostic information. Namely, more information can be collected with respect to the vehicle by adding the diagnostic information to the above backup data. Accordingly, a judging standard at a storing time of data as the diagnostic information, reliability of the ECU itself, etc. can be evaluated from results of the information collection by its frequency, etc. Further, since storing holding frequency of the diagnostic information is increased, generating date and hysteresis can be confirmed.

Further, when the backup data is stored and held in the technology center, an analysis can be made in consideration of an area generating the above diagnostic information and the surrounding environment if the present position provided by a navigation system is added to the backup data. It is also possible to analyze an area of communication inferiority, etc.

The ECU is operated by executing a program, and information (so-called version information) showing the date of manufacture and the functions is generally clearly shown in this program. Accordingly, if the version information of the ECU is added in the backup of the vehicle information in this embodiment, it is possible to judge whether problems arising in the ECU are solved in the present version, or are peculiar to this version. Therefore, the object vehicle can be easily understood. Since the version information of the ECU is understood, updating (so-called version up) to the latest program is easily recommended.

In this embodiment, the vehicle information is transmitted and received by the mobile body communication device, but the present invention is not limited to this case. For example, the backup data may be stored and held by connecting the vehicle with a center such as the dealer or the like by wired communication.

Third Embodiment

A third embodiment will next be explained. In the above embodiment, the vehicle information is stored to the exterior of a vehicle. However, in this embodiment, the present invention is applied to an information communication system for a vehicle in which a plurality of ECUs in charge of a plurality of electronic devices capable of setting conditions are constructed by a LAN for the vehicle so as to transmit and receive data. Backup data is held in the interior of the vehicle.

In this embodiment, the information communication system has a construction approximately similar to that in the above embodiment. Therefore, the same portions as the above embodiment are designated by the same reference numerals and their detailed explanations are omitted here. In this embodiment, the present invention is applied to a vehicle $10_i$ which is generically described as a vehicle 10, however, the present invention can be similarly applied to other vehicles. In the following explanation, generally notated right-hand lower indices are omitted with respect to the same reference numerals used in the above embodiment except for cases particularly requiring distinction.

Figure 11:
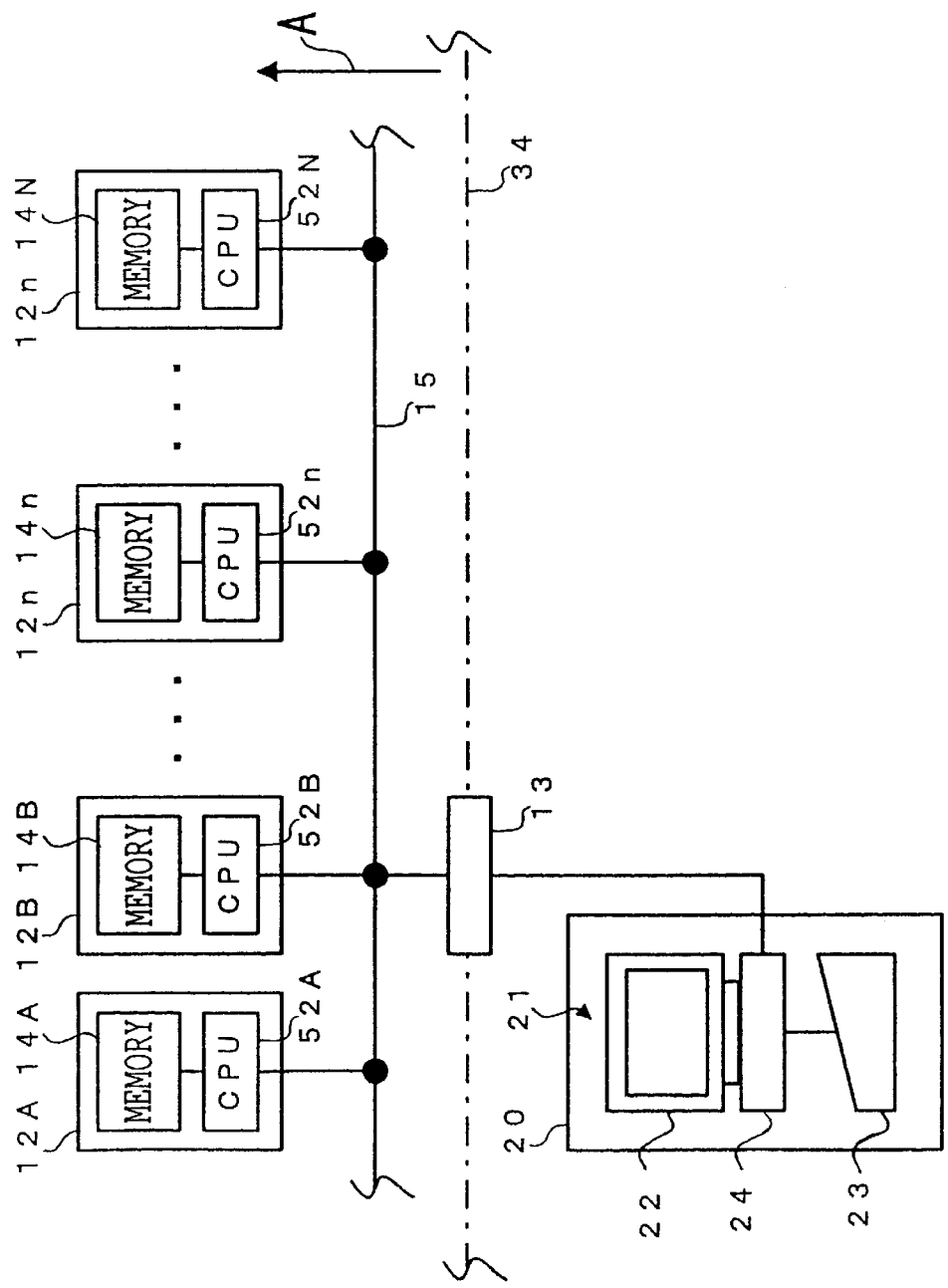
FIG. 11 is a block diagram showing the schematic construction of an information communication system for a vehicle in accordance with a third embodiment of the present invention.

As shown in FIG. 11, the information communication system for the vehicle in this embodiment has an ECU 12 mounted in the vehicle 10. The ECU 12 comprises a microcomputer as mentioned above. However, in this embodiment, the ECU 12 is constructed by ECUs 12A, 12B,—, 12N (N is the maximum number of mounted ECUs and these ECUs are hereinafter generalized and notated as ECU $12n:1 \leq n \leq N$) as a plurality of device control means for controlling the operations of governed electronic devices. Each of these ECUs 12n is provided within the vehicle and is connected to a data bus 15. This data bus 15 can be constructed by using a data bus determined by a standard such as ISO9141, etc.

In FIG. 11, one direction (the direction of an arrow A in FIG. 11) shows the interior of the vehicle and the other direction (a direction opposed to the direction of the arrow A in FIG. 11) shows the exterior of the vehicle with a boundary line 34 as a boundary. A LAN for the vehicle is constructed by connecting each ECU 12n to the data bus 15 in this way. In one example of the data bus 15, there is a LAN for the vehicle such as an audio system LAN 15A, a vehicle control system LAN 15B, a body system LAN 15C, etc. explained above, and this LAN for the vehicle is generally called the data bus 15 in the following description.

A connector 13 for enabling a connection (LAN connection) with a device outside the vehicle is connected to the above data bus 15. An adjuster 21 provided by a dealer 20 can be connected to this connector 13. The adjuster 21 is used to set and change parameters as characteristic values for determining the characteristics of the electronic devices governed by each ECU 12n. The adjuster 21 comprises a computer 24, a CRT 22 for displaying input data and the calculation results of the computer 24, etc., a keyboard 23 for inputting data, and the like. The computer 24 comprises a CPU, ROM, and RAM. A program for performing communication processing, etc. described later is stored in the ROM in advance.

Figure 12:
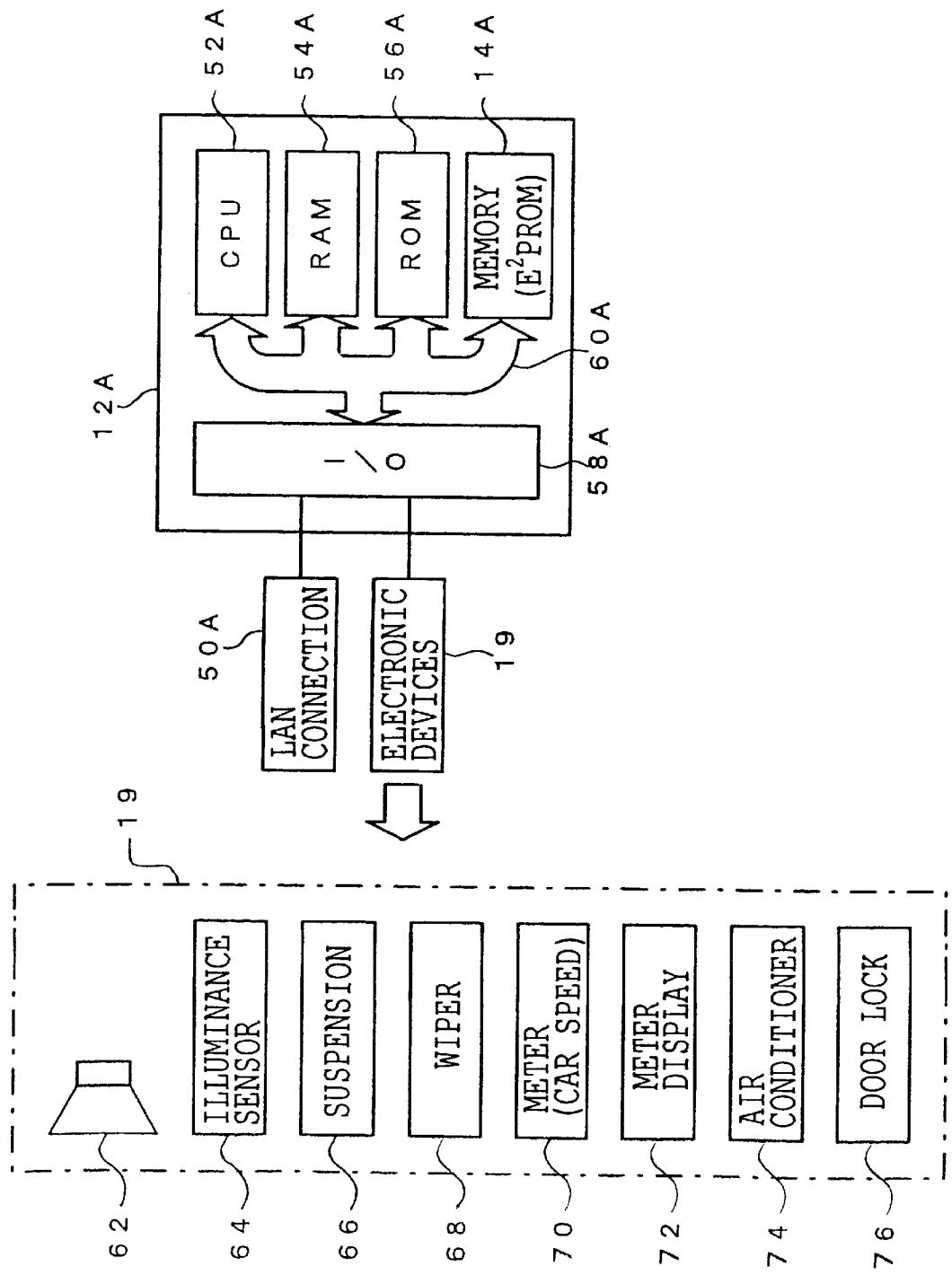
FIG. 12 is a block diagram showing a schematic construction of each ECU.

As shown in FIG. 12, the ECU 12A comprises a microcomputer composed of a CPU 52A, RAM 54A, ROM 56A, and an input/output port (I/O) 58A, which are connected to each other by a bus 60A so as to transmit and receive commands and data. Storage (memory) 14A for storing parameters (characteristic values) for setting conditions (setting characteristics) of the electronic devices mounted in the vehicle is connected to this bus 60A. $E^2PROM$ and flash memory can be used in the storage 14A. The type of vehicle in which the storage 14A is provided, a code showing the type of ECU 12A of the storage 14A and a code showing the connected electronic devices can also be stored in the storage 14A. Further, the parameters for determining the characteristics of the electronic devices governed by the ECU 12A can be stored as data in the storage 14A, and parameters stored in ECU other than the ECU 12A can also be stored as backup data in the storage 14A (described later in detail). This data corresponds to the main characteristic values of the present invention and the backup data corresponds to the subcharacteristic values of the present invention.

A harness 50A for a connection to the data bus 15 is connected to the input/output port 58A. The electronic device 19 in charge of the ECU 12A is also connected to the input/output port 58A.

One example of the electronic device 19 is partially explained in the above description. An electronic device 19 are an illuminance sensor 64, a suspension device 66, a wiper device 68, a meter portion 70 for detecting vehicle speed, a display unit 72 for illuminance and display of a meter, etc., an air conditioner 74, a door lock device 76, and a speaker device 62 capable of having the conditions thereof set. Parameters to be set as conditions of each of these electronic devices are stored in the storage 14n of each ECU 12n govern. These electronic devices 19 may be connected to the data bus 15.

The parameters for setting the conditions of each of the above electronic devices can be illuminance values of a light controller operated by the illuminance sensor 64 and the like. Further, these parameters may be the sound volume for preventing theft generated from the speaker device 74, the sound volume generated from the speaker device 74 at a wireless door lock time, a value for determining hardness of the suspension device 66, operating timing (for example, a central value of an INT) of the wiper device 68 during intermittent operation, etc., an operating time of a wiper 56, a meter brightness value of the display unit 72 for determining its brightness (this value is particularly effective when the amount of slanting incident light is large in a particular country or region), a unit (km/mile) of a running distance displayed in the display unit 72, timing (length and illuminance) of a headlamp device, a setting temperature and a setting value of cold and warm characteristics of the air conditioner 74, a car speed value for automatically locking a door by the door lock device 76, a shift pattern of an automatic gear change, etc.

The parameters of predetermined values are stored in the storage 14A as data in advance, but these values can be adjusted by requests and commands of a user, requests and commands of a dealer, etc. (described later in detail).

Each of the other ECUs 12B to 12N has a construction similar to that of the above ECU 12A and its detailed explanation is omitted here.

Operation of the information communication system in this embodiment will next be explained. This embodiment relates to a case in which the existing ECU 12A is detached and exchanged for a new ECU having the same construction.

In the following explanation, the parameters of electronic devices governed by each ECU 12n are stored (registered) in each storage in advance in each ECU 12n and are set to be stored as backup data in a storage of each ECU except for the ECU's own data. Nothing is set in be stored in a memory of the exchanged new ECU. The above backup data may be stored by a register device such as an adjuster described later, etc.

In the following explanation, the ECU which is itself to be exchanged or the like is notated as an ECU 12x and other ECUs are notated as ECU 12y.

Figure 13:
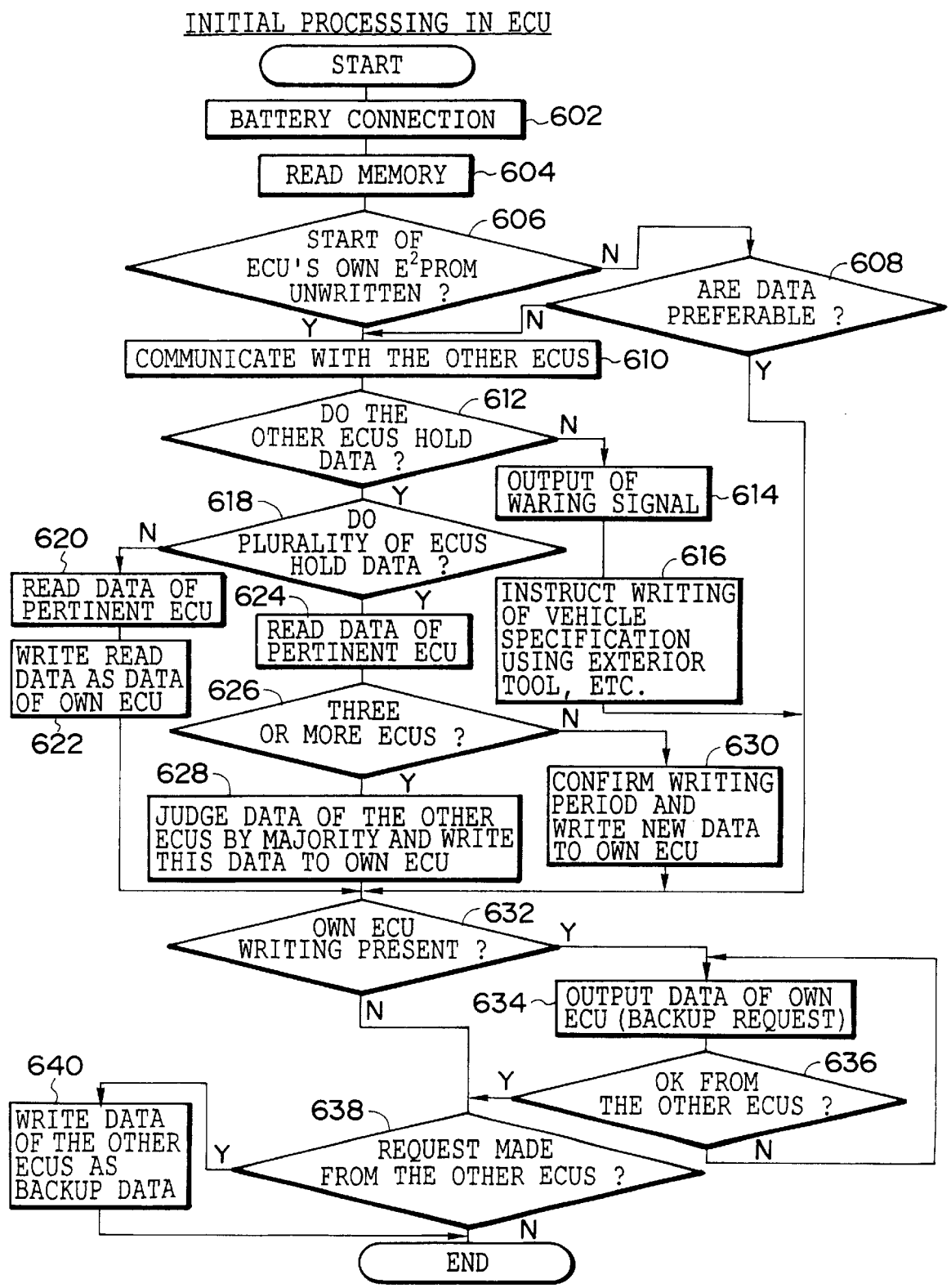
FIG. 13 is a flow chart showing a flow of initial processing of each ECU.

When the existing ECU 12x is detached and exchanged for the new ECU, a harness 50A is connected to a data bus 15 and a LAN for a vehicle is constructed and an electric current flows through the LAN by a battery connection. A processing routine of FIG. 13 is executed by this electric current flow in the new ECU 12x, and power connection confirming processing is executed by the battery connection, ignition-on, etc. in step 602.

In the next step 604, data as the parameters of the electronic device stored in the memory 14x is read. In the next step 606, existence or nonexistence of the read data is judged. Thus, it is judged whether the memory 14x of the ECU 12x is in an unwritten state or not. If the memory 14x is in a written state, a negative judgment is made in step 606 and the routine proceeds to step 608. In step 608, it is judged whether the read data is preferable data or not. It is possible to judge whether the read data is preferable data or not by judging whether it is defective data as described below or not. For example, there is defective data in which an unrecorded areas are dispersed throughout data which should be continuous. There is also defective data in which the data is different each time the data is read. Further, when the data is numerical and upper and lower limit values are determined in advance, the data is defective when the data lies outside the upper and lower limit values.

So-called data change caused by writing error data caused by initial defects in the IC, noise from the power source and the like is supposed as a cause of data defects. Data change is caused by static electricity and is also caused at the point in time when voltage for data writing and reading is applied, and is further caused when the applied voltage is insufficient. When the data defect is caused by such a data change, a negative judgment is made in step 608. In contrast to this, when there is no data defect, an affirmative judgment is made in step 608 and the routine proceeds to step 632.

When the memory 14x of the ECU 12x is in the unwritten state, an affirmative judgment is made in step 606 and the routine proceeds to step 610, and communication with each of the other ECUs 12y ($1 \leq y \leq N$, $y \neq x$) is performed through the data bus 15. This communication comprises an inquiry about the existence or nonexistence of the backup data and a response to this inquiry. In the next step 612, it is judged as a result of this communication whether the other ECUs 12y store (backup) data of the ECU 12x or not.

When no other ECUs 12y store the data of the ECU 12x, a negative judgment is made in the step 612. In step 614, a warning signal for urging that the ECU 12x is in an unwritten state is outputted. In the next step 616, a write command signal of vehicle specification data, i.e. parameters, is outputted using an adjuster tool, as described below, externally of the vehicle and the routine proceeds to step 632. When the warning signal for urging that the ECU 12x is in an unwritten state is outputted in the above steps 614 and 616, it is preferable to display a warning showing the necessity of writing of data to a display unit within the vehicle so as to urge a user.

When the other ECUs 12y store the data of the ECU 12x, an affirmative judgment is made in step 612. In the next step 618, it is judged whether the other ECUs 12y storing these data are a plurality or not. If one of the other ECUs 12y stores this data, a negative judgment is made in step 618 and the routine proceeds to step 620. In step 620, the backup data is read from this ECU 12y storing this data and is written as data of the memory 14x of the ECU 12x in the next step 622 and the routine proceeds to step 632.

When the plurality of other ECUs 12y store the data of the ECU 12x, an affirmative judgment is made in step 618. In step 624, the backup data is read from the pertinent plurality of other ECUs 12y. In the next step 626, it is judged whether the pertinent other ECUs 12y are three ECUs or more. If the pertinent other ECUs 12y are two ECUs (a negative judgment is made in step 626), new backup data is determined as the backup data employed in the next step 630 and is written as data of the memory 14x of the self ECU 12x, and the routine proceeds to step 632. Whenever the data of other ECUs is stored as backup data in a particular ECU, the above-described new backup data can be determined by reading the storing time of the backup data as well as the backup data.

When the pertinent other ECUs 12y are three ECUs or more (an affirmative judgment is made in step 626), the backup data which will be adopted is determined by majority decision in the next step 626 and is written as data of the memory 14x of the ECU 12x and the routine proceeds to step 632. In judging the backup data by majority, the backup data of one ECU from among a plurality of ECUs storing the same backup data may be judged. This is because the more ECUs storing the same backup data, the more reliable that backup data can be considered to be. When the ECUs are separated into a plurality of groups with each of which group storing its own backup data or, alternatively, or when each set of backup data differs from the others, then the new backup data is determined as the backup data employed, as was described for step 630 above.

When the memory 14x of the ECU 12x is in the unwritten state, the backup data stored in the other ECUs 12y can be written as data of the ECU 12x by the above processing. Reliable backup data stored in the other ECUs 12y can be also written as data of the ECU 12x when the memory 14x is in the written state and reliability of data is low by the data change, etc. Further, when the memory 14x of the ECU 12x is in the unwritten state and this data is not stored in the other ECUs 12y as backup data, writing of this data can be urged by an exterior tool, etc.

As explained above, when data of the memory 14x of the ECU 12x is stored in the other ECUs 12y as backup data, it is preferable to store this data by adding a discriminating code for discriminating that the stored backup data is the data of the ECU 12x. When the discriminating code is added to this data, it is possible to easily judge only by outputting the backup data whether or not the data of a receiving ECU is a backup of data stored in its own memory.

Processings from the above step 604 to the step 630 correspond to the processing of an update means of the present invention. An adjuster described later can be also set to function as the update means of the present invention.

Next, it is judged by the above processings in the step 632 whether data is written to the memory 14x of the ECU 12x or not. When data is written to the memory 14x, an affirmative judgment is made in step 632. In step 634, a backup request signal is outputted and data is outputted until a completion signal is received (an affirmative judgment is made in step 636) such that the data of the ECU 12x is stored in the other ECUs 12y as backup data. The other ECUs 12y output the completion signal when the data of the ECU 12x is completely stored in the other ECUs 12y as backup data. When this completion signal is received, the routine proceeds to a step 638.

The data of the ECU 12x can be stored in the other ECUs 12y as backup data by these processings from the step 632 to the step 636.

In the next step 638, it is judged whether the backup request signal is inputted from the other ECUs 12y or not. Thus, it is judged whether a backup request of the other ECUs 12y is made or not. When the backup request is made, data of the other ECUs 12y is received in the next step 640 and is written to the memory 14x as backup data and this routine is terminated. When the backup data is stored in this step 640, it is preferable to simultaneously store the recording time as explained above. In contrast to this, when there is no backup request, a negative judgment is made in step 638 and this routine is terminated The data of the other ECUs 12y can be stored in the ECU 12x as backup data by these processings in the steps 638 and 610.

The processings from the above step 632 to step 640 correspond to the processing of the register means of the present invention. The adjuster described later can also be set to function as the update means of the present invention.

Data stored in the memory of each ECU can be automatically restored to reliable data by executing the processing of FIG. 3 at regular predetermined times even when a data change is caused with the passage of time.

Writing processing of data using an exterior tool and designated in the above steps 614 and 616 will next be explained. This processing corresponds to the processing of a changing means of the present invention.

When a user requests a change in parameters, or when the vehicle has a regular maintenance check or is repaired, the vehicle is held by the dealer. When the vehicle is held by the dealer and a connector 13 of the vehicle is connected by an operation of the dealer, each ECU is set to a checking mode and the tool processing routine of FIG. 14 is executed in each ECU.

Figure 14:
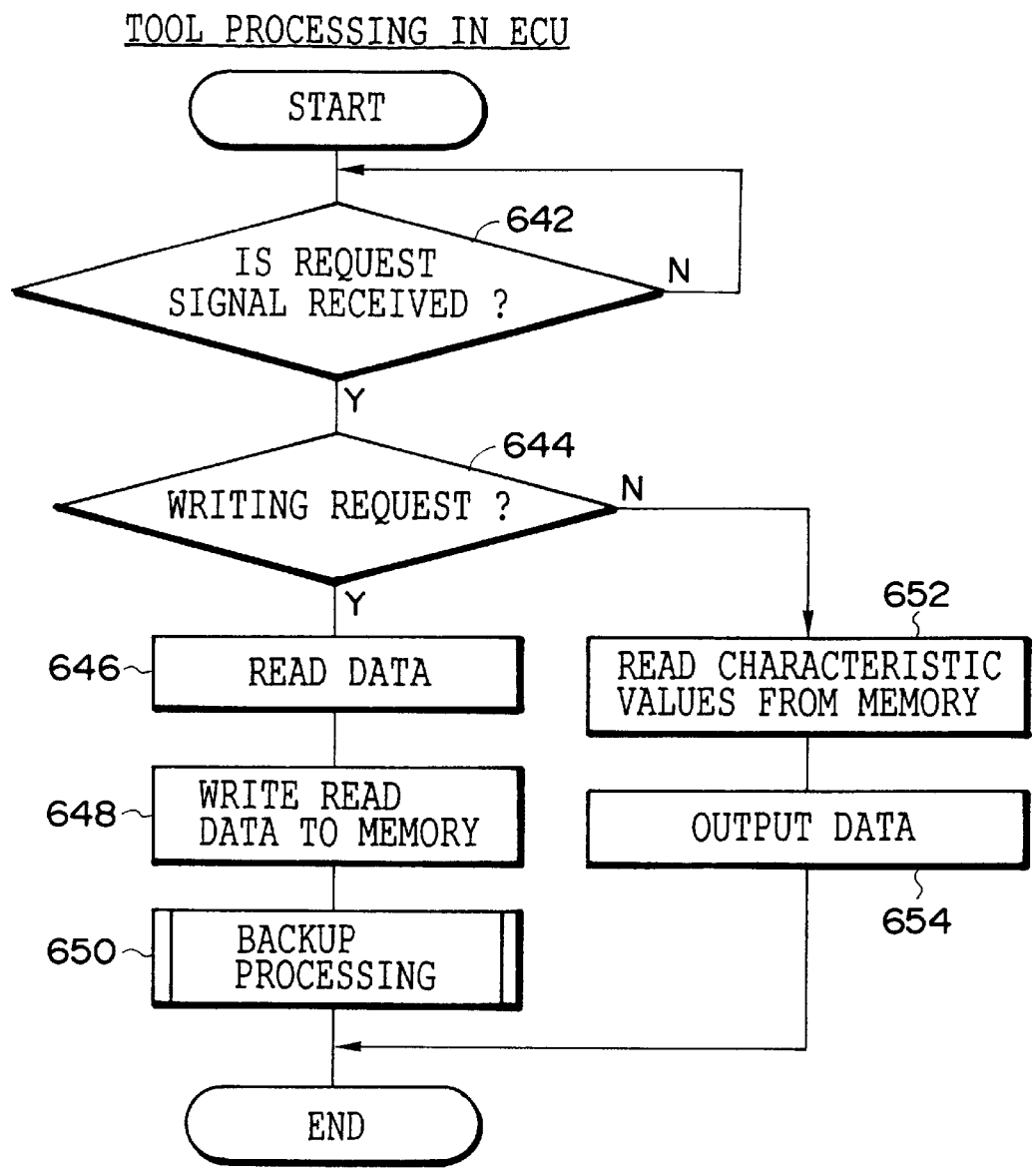
FIG. 14 is a flow chart showing a flow of tool processing of each ECU.

In a step 642 of FIG. 14, power connection confirming processing is performed by a battery connection, ignition-on, etc. Thereafter, this power connection confirming processing is repeatedly executed until a request signal is received. When the request signal is received, the routine proceeds to step 644 and it is judged whether the received request signal is a write request signal or not.

When it is judged in step 644 that the write request signal is received, the routine proceeds to step 646 and data for writing is read. The read data is written to the memory 14x of the ECU 12x in the next step 648. In this writing processing, the read data is written as data when the read data is a parameter to be stored by the ECU 12x. The read data is written as backup data when the read data is a parameter to be stored by the other ECUs 12y.

In the next step 650, backup processing relative to the above writing processing (steps 646, 148) is performed. The backup processing in step 650 is similar to the processings from step 632 to step 636 in FIG. 13. Namely, since the data (or the backup data) is written to the memory 14x of the ECU 12x, it is necessary to store the data in the memory 14y of each of the other ECUs 12y as backup data when this data is written. Therefore, as mentioned above, steps 632 to 136 in FIG. 13 are executed. When data is written to the memory 14x of the ECU 12x, the backup request signal and data are outputted so as to store the data of the ECU 12x in the other ECUs 12y as backup data until a completion signal from the others is received. Then, this routine is terminated.

In contrast to this, when a read request signal is received and a negative judgment is made in step 644, the routine proceeds to step 652. In step 652, the data stored in the memory 14x of the ECU 12x is read and outputted in the next step 654 and this routine is terminated.

Figure 15:
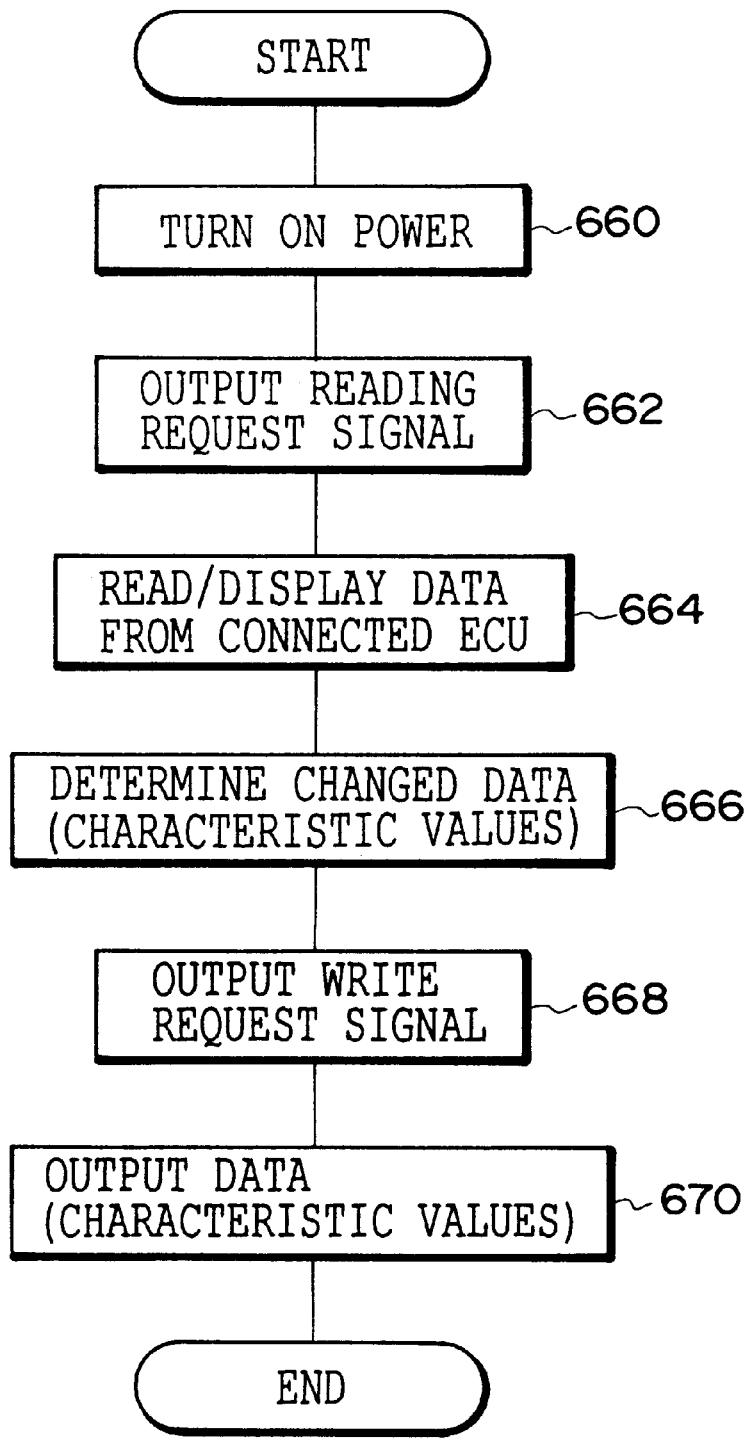
FIG. 15 is a flow chart showing a flow of an adjusting processing routine of an adjusting device.

Thus, each ECU can read and write data. When a vehicle is held in stock by a dealer, an operator on the dealer's side connects the computer 24 and a connector 13 of the data bus 15 constructed as a LAN within the vehicle, and sets an adjusting mode by a keyboard operation. Thus, an adjusting processing routine of FIG. 15 is executed in the adjuster 21.

In step 660 of FIG. 5, it is confirmed whether the connector connection is correctly made or not. In the next step 662, a read request signal showing a request for outputting parameters is outputted to each ECU of the connected vehicle. In the next step 664, the parameters stored in the memory 14n ($E^2$PROM) of the vehicle are read by reading data transmitted from the vehicle. In this step 664, the read data (parameters) is displayed on the CRT 22. In the next step 666, the operator on the dealers side refers to the parameters displayed on the CRT 22 and inputs the parameters to be set by the keyboard 23. In the next step 668, a write request signal is outputted to each ECU 12n of the vehicle. It is preferable to add attribute information showing this ECU 12n to the data when the data is read. This is because data is inputted from a plurality of ECUs and it is necessary to discriminate this data from the read data. In the next step 670, the inputted parameters are outputted as data to the ECU through the data bus 15. The data outputted in this step 670 may be also set as information adding the attribute information showing the ECU 12n to be stored, i.e., ECU information comprising an attribute showing the ECU and the parameter.

Thus, data from the adjuster 21 is received in the ECU 12n and can be stored (updated) in a memory as newest data.

When the above processing in the above step 670 is terminated, it is confirmed whether the connector is disconnected or not. If the connector is disconnected, this routine is terminated.

Thus, the dealer can input data as parameters by referring to the parameters read from the vehicle and can store the inputted data in the pertinent ECU. Accordingly, it is possible to easily judge whether the parameters are abnormal or not. Further, the newest parameters can be stored in the ECU.

When the data is stored in the pertinent ECU, this data is stored in the other ECUs as backup data. Accordingly, the data as the newest parameter can be stored in the pertinent ECU and can be stored in each of the ECUs as backup so that the newest parameters can be stored with high reliability.

As explained above, in this embodiment, the parameter of an electronic device in charge of the self ECU is stored to the memory of each of the other ECUs between a plurality of ECUs connected to the LAN for the vehicle constructed within the vehicle. Accordingly, the self parameter can be stored as a backup and can be commonized.

Further, by communication between a plurality of ECUs, the data of the ECU's own memory can be renewed using the ECU's own backed up parameters. Accordingly, data with high reliability can be also maintained even when data with low reliability from data change and the like is generated. Further, the data of the ECU's own memory can also be renewed using the ECU's own backed up parameters when an existing ECU is replaced by a new ECU. Accordingly, this data can be maintained with high reliability and vehicle specifications, i.e., the parameters can be maintained in a state of high reliability.

Further, when the parameters are newly set or changed from an external device such as an adjuster, etc., data which are the updated parameters, is stored in the memory of each of the other ECUs as backup data. Accordingly, the newest parameters can be made common to the plurality of ECUs connected to the LAN for the vehicle when the parameters are newly set or changed.

In the above embodiment, in each ECU, the parameters of an electronic device governed by an ECU is stored as data, and the parameters of the electronic devices governed by each of the other ECUs is stored as backup data. However, the present invention is not limited to this case and the parameters may, for example, also be stored in at least one ECU among the plurality of ECUs.

In the above embodiment, the existing ECU is detached and exchanged for a new one having the same construction. However, the present invention is not limited to this case, but can be also applied to a case in which ECUs are newly provided. In this case, since the memory of the new ECU is empty and no backup data exists in the other ECUs, data is written and set by an external device such as an adjuster, etc. The data of the new ECU is made common by storing this data in the other ECUs as backup at the time of this writing. The parameters of the new ECU can be also adjusted by referring to the parameters of the existing ECU.

INDUSTRIAL APPLICABILITY

As mentioned above, the vehicle information communication device and the vehicle information communication system in the present invention are suitably used in a communication device for transmitting and receiving information within a controller mounted on a vehicle, or transmitting and receiving information between the controller mounted on the vehicle and a center provided outside the vehicle. In particular, the vehicle information communication device and the vehicle information communication system in the present invention are suitably used in a communication device communicating with the vehicle about information when the characteristics of a device within the vehicle capable of changing the characteristics are changed by a user's intention, geographical requirements, or the like.

What is claimed is:

1. A vehicle information communication device comprising:
   control means for a vehicle, which is mounted in the vehicle and is connected to a vehicle onboard device having characteristics capable of being changed, and which stores characteristic values for determining characteristics of said vehicle onboard device and controls the characteristics of said vehicle onboard device using characteristic values; and
   communication control means which is provided externally of said vehicle and can be connected to said control means for a vehicle by wireless communication, and which comprises receiving means for receiving information from said control means for a vehicle and transmitting means for transmitting information to said control means for a vehicle, and which stores and accumulates characteristic values for determining the characteristics of said vehicle onboard device, including previously determined characteristic values of said control means for a vehicle, and which reads characteristic values stored in said control means for a vehicle as vehicle information, and obtains the accumulated vehicle information corresponding to the read characteristic values, and updates the characteristic values stored in said control means for a vehicle to the characteristic values included in said obtained vehicle information.

2. A vehicle information communication device according to claim 1, wherein said communication control means comprises:
   accumulating means for accumulating vehicle information including previously determined characteristic values of said control means for a vehicle; and
   communication control means which is connected to said control means for a vehicle and to said accumulating means and reads characteristic values stored in said control means for a vehicle as vehicle information and obtains the vehicle information accumulated in said accumulating means with corresponds to the read vehicle information, and updates the characteristic values stored in said control means for a vehicle to the characteristic values included in the obtained vehicle information.

3. A vehicle information communication device according to claim 2, wherein said accumulating means accumulates vehicle information calculated on the basis of the vehicle information of a plurality of vehicles read by said communication control means.

4. A vehicle information communication device according to claim 1, wherein said control means for the vehicle is connected to a plurality of vehicle onboard devices each of which having characteristics capable of being changed by a local area network for a vehicle, and stores each characteristic value for determining the characteristics of each of said plurality of vehicle onboard devices, and controls the characteristics of each of said plurality of vehicle onboard devices using each characteristic value.

5. A vehicle information communication device according to claim 1, wherein, when said communication control means transmits and receives information including characteristic values between said control means for a vehicle and said communication control means, said receiving means and said transmitting means simultaneously perform at least one portion of the reception of said information in said receiving means and the transmission of said information in said transmitting means.

6. The vehicle information communication device according to claim 1, wherein said communication control means receives request information requested from a vehicle from said control means for a vehicle, and transmits response information expressing a response to said request information from said communication control means to said control means for a vehicle.

7. The vehicle information communication device as claimed in claim 1, wherein said communication control means is connected to said control means for a vehicle by wireless communication using a mobile wireless telephone circuit.

8. A vehicle information communication device comprising:

control means for a vehicle in which the control means for the vehicle is mounted in the vehicle and comprises a plurality of device control means which are connected to a plurality of vehicle onboard devices having characteristics capable of being changed and which control characteristics for determining the characteristics of each vehicle onboard device governed by the respective device control means, wherein each device control means is provided with memory means for storing characteristic values for determining the characteristics of said vehicle onboard device as main characteristic values, and for being capable of storing characteristic values for determining characteristics of another vehicle onboard device as sub-characteristic values, and controls the characteristics of the vehicle onboard device governed by the device control means on the basis of the main characteristic values stored in the memory means;

register means which can be connected to said control means for a vehicle and which stores characteristic values of the governed vehicle onboard device in each of the memory means of said device control means as main characteristic values, and stores main characteristic values except for the main characteristic values to be stored in at least one of said memory means in memory means as sub-characteristic values; and update means which can be connected to said control means for a vehicle and which obtains the main characteristic values and the sub-characteristic values stored in each of the memory means of said device control means, and calculates the main characteristic values of the device control means relating to the obtained sub-characteristic values on the basis of the obtained sub-characteristic values and the main characteristic values stored in the memory means of the device control means relating to sub-characteristic values, and updates the calculated main characteristic values as the main characteristic values of the memory means of said device control means.

9. A vehicle information communication device according to claim 8, further comprising changing means for changing the main characteristic values stored in said memory means wherein, when the main characteristic values are changed by said changing means, said register means stores the main characteristic values in the memory means except for the memory means having the changed main characteristic values as sub-characteristic values.

10. A vehicle information communication device according to claim 8, wherein the plurality of device control means of said control means for a vehicle are connected to each other by a local area network for the vehicle.

11. A vehicle information communication system in which information is communicated between control means for a vehicle for controlling characteristics of a vehicle onboard device mounted in the vehicle using characteristic values for determining the characteristics of the vehicle onboard device and characteristic value memory means provided externally of said vehicle for storing said characteristic values, wherein characteristic values for determining the characteristics of said vehicle onboard device, including predetermined characteristic values of said control means for a vehicle are stored and accumulated in said characteristic value memory means and wherein the characteristic values stored in said control means for the vehicle are read as vehicle information, vehicle information corresponding to the read characteristic values and accumulated in said characteristic value memory means is obtained, and the characteristic values stored in said control means for the vehicle are updated to the characteristic values included in said obtained vehicle information.

12. A vehicle information communication system in which information is communicated between control means for a vehicle for controlling characteristics of a vehicle onboard device mounted in the vehicle using characteristic values for determining the characteristics of the vehicle onboard device and characteristic value memory means provided externally of said vehicle for storing said characteristic values, wherein the vehicle information communication system simultaneously performs at least one portion of each of processing for receiving information including said characteristic values from said control means for a vehicle connected by wireless communication, and processing for transmitting information including said characteristic values to said control means for a vehicle connected by wireless communication, the characteristic values for determining the characteristics of said vehicle onboard device, including predetermined characteristic values of said control means for a vehicle are stored and accumulated in said characteristic value memory means, and wherein the characteristic values stored in said control means for a vehicle are read as vehicle information, vehicle information corresponding to the read characteristic values and accumulated in said characteristic value memory means is obtained, and the characteristic values stored in said control means for a vehicle are updated to the characteristic values included in said obtained vehicle information.

13. A vehicle information communication system in which information is communicated between control means for a vehicle for controlling characteristics of a vehicle onboard device mounted in the vehicle using characteristic values for determining the characteristics of the vehicle onboard device and characteristic value memory means provided externally of said vehicle for storing said characteristic values, wherein said control means for the vehicle comprises a plurality of device control means each controlling characteristics for determining the characteristics of each vehicle onboard device governed by the respective device control means, and each device control means has memory means for storing the characteristic values for determining the characteristics of said vehicle onboard device as main characteristic values, and for being capable of storing characteristic values for determining characteristics of other vehicle onboard device as sub-characteristic values, and controls the characteristics of the governed vehicle onboard device on the basis of the main characteristic values stored in the memory means;

said control means for the vehicle stores the characteristic values of the governed vehicle onboard device in each of the memory means of said device control means as main characteristic values, and stores main characteristic values except for the main characteristic values to be stored in at least one of said memory means in memory means as sub-characteristic values; and said control means for a vehicle obtains the main characteristic values and the sub-characteristic values stored in each of the memory means of said device control means, and calculates the main characteristic values of the device control means relating to the obtained sub-characteristic values on the basis of the obtained sub-characteristic values and the main characteristic values stored in the memory means of the device control means relating to sub-characteristic values, and updates the calculated main characteristic values as the main characteristic values of the memory means of said device control means.

* * * * *